(12) United States Patent
Dinh et al.

(10) Patent No.: US 12,229,921 B2
(45) Date of Patent: Feb. 18, 2025

(54) IMAGE PROCESSING APPARATUS AND METHOD OF PROCESSING MULTI-FRAMES USING THE SAME

(71) Applicant: SAMSUNG ELECTRONICS CO., LTD., Suwon-si (KR)

(72) Inventors: Quockhanh Dinh, Suwon-si (KR); Kyonghwan Jin, Suwon-si (KR); Kwangpyo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 361 days.

(21) Appl. No.: 17/554,827

(22) Filed: Dec. 17, 2021

(65) Prior Publication Data

US 2022/0198628 A1 Jun. 23, 2022

Related U.S. Application Data

(63) Continuation of application No. PCT/KR2021/018430, filed on Dec. 7, 2021.

(30) Foreign Application Priority Data

Dec. 18, 2020 (KR) .................. 10-2020-0179005
Jun. 10, 2021 (KR) .................. 10-2021-0075637

(51) Int. Cl.
*G06T 5/50* (2006.01)
*G06N 3/04* (2023.01)
(Continued)

(52) U.S. Cl.
CPC ............. *G06T 5/50* (2013.01); *G06N 3/04* (2013.01); *G06T 5/20* (2013.01); *G06V 10/761* (2022.01);
(Continued)

(58) Field of Classification Search
None
See application file for complete search history.

(56) References Cited

U.S. PATENT DOCUMENTS 10,547,858 B2 1/2020 Wang et al.
2007/0291842 A1* 12/2007 Au .................. H04N 19/86
375/E7.19

(Continued)

FOREIGN PATENT DOCUMENTS

CN 111263161 A * 6/2020 ........... G06N 3/0454
CN 111291745 A 6/2020
(Continued)

OTHER PUBLICATIONS

Dario Fuoli et al., "Efficient Video Super-Resolution through Recurrent Latent Space Propagation", arXiv:1909.08080v1, Oct. 27, 2019, 10 pages total.

(Continued)

*Primary Examiner* — Vincent Rudolph
*Assistant Examiner* — Nicholas Crespo Stazer
(74) *Attorney, Agent, or Firm* — Sughrue Mion, PLLC

(57) ABSTRACT

An image processing apparatus, including a memory configured to store one or more instructions; and a processor configured to execute the one or more instructions stored in the memory to cause the image processing apparatus to: identify, in a previous frame, a prediction sample corresponding to a current sample of a current frame, generate a prediction frame for the current frame by changing a sample value of a collocated sample of the previous frame according to a sample value of the prediction sample, derive a weight by comparing a sample value of the current sample with the sample value of the prediction sample, apply the weight to a collocated sample of the prediction frame to obtain a weighted prediction frame, and obtain a current output frame by processing the current frame and the weighted prediction (Continued)

frame through a neural network comprising a convolution layer.

15 Claims, 17 Drawing Sheets

(51) Int. Cl.
*G06T 5/20* (2006.01)
*G06V 10/74* (2022.01)
*G06V 10/77* (2022.01)
*G06V 10/82* (2022.01)
*H04N 19/85* (2014.01)

(52) U.S. Cl.
CPC .......... *G06V 10/7715* (2022.01); *G06V 10/82* (2022.01); *H04N 19/85* (2014.11); *G06T 2207/10016* (2013.01); *G06T 2207/20084* (2013.01)

(56) References Cited

U.S. PATENT DOCUMENTS

2019/0297326 A1    9/2019   Reda et al.
2021/0385383 A1   12/2021   Kim et al.

FOREIGN PATENT DOCUMENTS

| CN | 111866521 A | 10/2020 |
|----|-------------|---------|
| KR | 10-1221227 B1 | 1/2013 |
| KR | 10-1517233 B1 | 5/2015 |
| KR | 10-1987079 B1 | 6/2019 |
| KR | 10-2020-0048609 A | 5/2020 |

OTHER PUBLICATIONS

Communication dated Mar. 22, 2022, issued by the International Searching Authority in counterpart International Application No. PCT/KR2021/018430 (PCT/ISA/220, 210, 237).

Li et al., "Optical Flow Based Co-Located Reference Frame for Video Compression," IEEE Transactions oOn Image Processing, vol. 29, pp. 8303-8315, Aug. 12, 2020 (Total 15 pages).

Tong et al., "Learning-Based Multi-Frame Video Quality Enhancement," 2019 IEEE International Conference on Image Processing (ICIP), pp. 929-933, Aug. 26, 2019 (Total 7 pages).

European Extended Search Report issued Nov. 18, 2024 by the European Patent Office for EP Patent Application No. 21906959.8.

\* cited by examiner

IMAGE PROCESSING APPARATUS AND METHOD OF PROCESSING MULTI-FRAMES USING THE SAME

This application is Continuation of International Application No. PCT/KR2021/018430, which was filed on Dec. 7, 2021, and claims priority to Korean Patent Application No. 10-2020-0179005, which was filed on Dec. 18, 2020, and Korean Patent Application No. 10-2021-0075637, which was filed on Jun. 10, 2021, the contents of which are incorporated by reference herein in their entireties.

TECHNICAL FIELD

The disclosure relates to image or frame processing, and more particularly to processing multiple images or multiple frames based on a neural network.

BACKGROUND ART

There are various technologies for processing an image before the image is encoded or displayed. Image processing may be technology for processing all types of information that is input/output as an image, and refers to a technology for processing and converting an image for better human understanding or secondary applications, such as image enhancement, emphasis, or compression.

Image processing has been developed based on an algorithm. With the recent development of artificial intelligence, a large part of image processing has been performed based on artificial intelligence. A neural network may be a representative example of an artificial intelligence model.

A neural network may be trained through training data. A neural network may obtain a desired processing result by processing an image by using a weight value set through training. However, neural network-based image processing has so far been ineffective in processing temporally related multi-frames.

DESCRIPTION OF EMBODIMENTS

Technical Problem

A technical objective is to effectively process frames by considering a temporal correlation between multi-frames.

Technical Solution to Problem

According to an embodiment of the disclosure, an image processing apparatus includes a memory configured to store one or more instructions, and a processor configured to execute the one or more instructions stored in the memory to identify, in a previous frame, a prediction sample corresponding to a current sample of a current frame, generate a prediction frame of the current frame by changing a sample value of a collocated sample of the previous frame according to a sample value of the prediction sample, derive a weight by comparing a sample value of the current sample with the sample value of the prediction sample, apply the weight to a collocated sample of the prediction frame, and obtain a current output frame by processing the current frame and a weighted prediction frame through a neural network comprising a convolution layer.

Advantageous Effects of Disclosure

An image processing apparatus and a method of processing multi-frames using the same according to an embodiment of the disclosure may improve the processing performance of a current frame by processing the current frame based on a temporal correlation between the current frame and a previous frame.

However, technical effects of the image processing apparatus and the method of processing multi-frames using the same according to an embodiment of the disclosure are not limited thereto, and other unmentioned technical effects will be apparent to one of ordinary skill in the art from the following description.

BRIEF DESCRIPTION OF DRAWINGS

Descriptions about respective drawings are provided to gain a sufficient understanding of the drawings of the present specification.

BEST MODE

Figure 1:
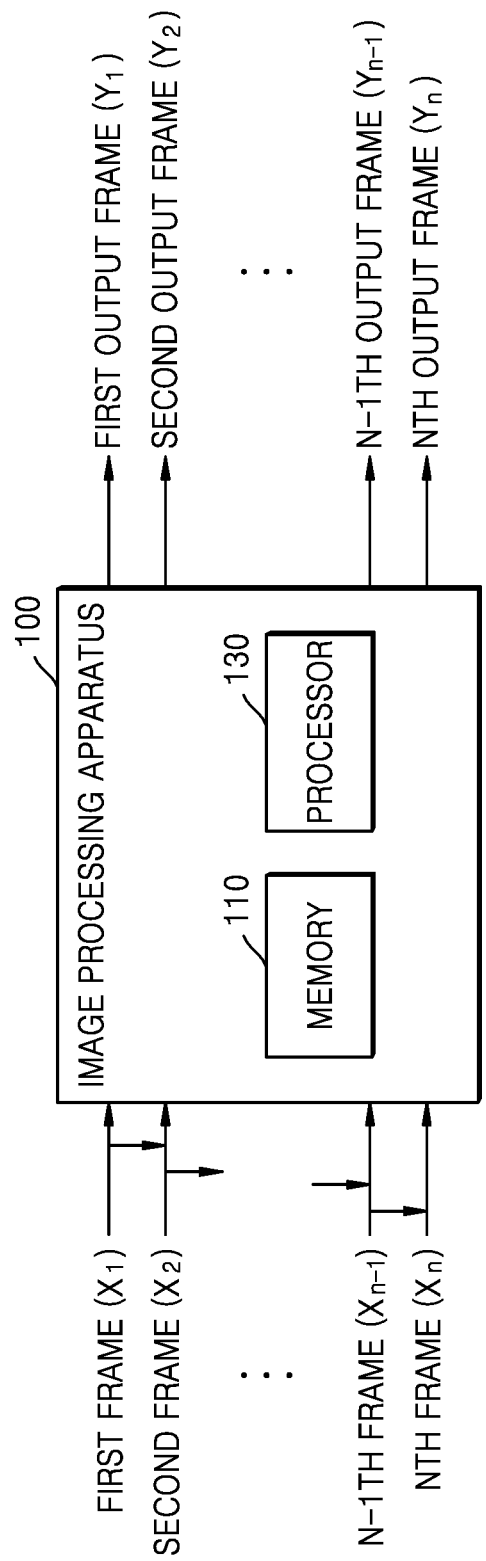
FIG. 1 is a diagram illustrating a configuration of an image processing apparatus, according to an embodiment.

In accordance with an aspect of the disclosure, an image processing apparatus includes a memory configured to store one or more instructions; and a processor configured to execute the one or more instructions stored in the memory to: identify, in a previous frame, a prediction sample corresponding to a current sample of a current frame, generate a prediction frame for the current frame by changing a sample value of a collocated sample of the previous frame, wherein the collocated sample of the previous frame is collocated with the current sample, according to a sample value of the prediction sample, derive a weight by comparing a sample value of the current sample with the sample value of the prediction sample, apply the weight to a collocated sample of the prediction frame, wherein the collocated sample of the prediction frame is collocated with the current sample, to obtain a weighted prediction frame, and obtain a current output frame by processing the current frame and the weighted prediction frame through a neural network comprising a convolution layer.

The processor may be further configured to execute the one or more instructions to identify, as the prediction sample, a most similar sample of the previous frame, wherein the most similar sample has a sample value that is most similar to the sample value of the current sample from among sample values of the collocated sample of the previous frame and neighboring samples of the collocated sample of the previous frame.

The processor may be further configured to execute the one or more instructions to: perform convolution processing on the current sample and neighboring samples of the current sample by using a pre-determined first filter kernel to obtain a first sample value corresponding to the first filter kernel, perform the convolution processing on the collocated sample of the previous frame and the neighboring samples of the collocated sample by using a plurality of pre-determined second filter kernels to obtain second sample values corresponding to the plurality of second filter kernels, identify a second sample value that is most similar to the first from among the second sample values, and determine, as the prediction sample, a corresponding sample which corresponds to the second sample from among the collocated sample of the previous frame and the neighboring samples of the collocated sample of the previous frame.

In the first filter kernel, a first filter sample corresponding to the current sample may have a pre-set first value, and remaining first filter samples have a value of 0.

In the plurality of second filter kernels, one second filter sample has a pre-set second value, and remaining second filter samples have the value of 0, wherein a location of the one second filter sample is different for each of the plurality of second filter kernels.

A sign of the pre-set first value may be opposite to a sign of the pre-set second value.

The processor may be further configured to execute the one or more instructions to perform the convolution processing on the collocated sample of the previous frame and the neighboring samples of the collocated sample of the previous frame by using a pre-determined third filter kernel to change the sample value of the collocated sample of the previous frame, wherein, in the third filter kernel, a third filter sample corresponding to the prediction sample has a pre-set third value, and remaining third filter samples have a value of 0.

The weight may be inversely proportional to a difference between the sample value of the current sample and the sample value of the prediction sample.

The processor may be further configured to execute the one or more instructions to: obtain a previous output frame and a previous feature map output as a result of processing the previous frame by using the neural network, change sample values of collocated samples of the previous output frame and the previous feature map according to a positional relationship between the current sample and the prediction sample in the previous frame to generate a prediction output frame and a prediction feature map, apply the weight to collocated samples of the prediction output frame and the prediction feature map to obtain a weighted prediction output frame and a weighted prediction feature map, and input the weighted prediction output frame, the weighted prediction feature map, the weighted prediction frame, and the current frame, to the neural network.

The previous output frame may include a first previous output frame output from the neural network, and a second previous output frame obtained as a result of processing the first previous output frame, which is reconstructed through encoding and decoding the first previous output frame, through the neural network.

The neural network may include a plurality of sub-neural networks comprising a first convolution layer, a second convolution layer, and a plurality of third convolution layers, wherein the first convolution layer of a first sub-neural network is configured to performed convolution processing on a result of concatenating the weighted prediction output frame, the weighted prediction frame, and the current frame, wherein the second convolution layer of the first sub-neural network is configured to perform the convolution processing on the weighted prediction feature map, and wherein the plurality of third convolution layers of the first sub-neural network are configured to sequentially perform the convolution processing on a result of concatenating a feature map output from the first convolution layer of the first sub-neural network and a feature map output from the second convolution layer of the first sub-neural network.

The first convolution layer of a sub-neural network other than the first sub-neural network may be configured to perform the convolution processing on a result of concatenating the weighted prediction frame, the current frame, and an intermediate output frame output from a previous sub-neural network, wherein the second convolution layer of the sub-neural network other than the first sub-neural network is configured to perform the convolution processing on an intermediate feature map output from the previous sub-neural network, and wherein the plurality of third convolution layers of the sub-neural network other than the first sub-neural network are configured to sequentially perform the convolution processing on a result of concatenating a feature map output from the first convolution layer of the sub-neural network other than the first sub-neural network and a feature map output from the second convolution layer of the sub-neural network other than the first sub-neural network.

The processor may be further configured to execute the one or more instructions to transmit, to a terminal device, a bitstream generated through encoding performed on the current output frame.

The processor may be further configured to execute the one or more instructions to reproduce the current output frame through a display.

In accordance with an aspect of the disclosure, a method, performed by an image processing apparatus, of processing multi-frames includes identifying, in a previous frame, a prediction sample corresponding to a current sample of a current frame; changing a sample value of a collocated sample of the previous frame, wherein the collocated sample of the previous frame is collocated with the current sample, according to a sample value of the prediction sample to generate a prediction frame for the current frame; deriving a weight by comparing a sample value of the current sample with the sample value of the prediction sample; applying the weight to a collocated sample of the prediction frame, wherein the collocated sample of the prediction frame is collocated with the current sample, to obtain a weighted prediction frame; and processing the current frame and the weighted prediction frame through a neural network comprising a convolution layer to obtain a current output frame.

In accordance with an aspect of the disclosure, a non-transitory computer-readable recording medium stores a program which, when executed by at least one processor, causes the at least one processor to: identifying, in a previous frame, a prediction sample corresponding to a current sample of a current frame; changing a sample value of a collocated sample of the previous frame, wherein the collocated sample of the previous frame is collocated with the current sample, according to a sample value of the prediction sample to generate a prediction frame for the current frame; deriving a weight by comparing a sample value of the current sample with the sample value of the prediction sample; applying the weight to a collocated sample of the prediction frame, wherein the collocated sample of the prediction frame is collocated with the current sample, to obtain a weighted prediction frame; and processing the current frame and the weighted prediction frame through a neural network comprising a convolution layer to obtain a current output frame.

Mode of Disclosure

Throughout the disclosure, the expression "at least one of a, b or c" indicates only a, only b, only c, both a and b, both a and c, both b and c, all of a, b, and c, or variations thereof.

As the disclosure allows for various changes and numerous examples, particular embodiments of the disclosure will be illustrated in the drawings and described in detail in the written description. However, this is not intended to limit the disclosure to particular modes of practice, and it will be understood that all changes, equivalents, and substitutes that do not depart from the spirit and technical scope of various embodiments of the disclosure are encompassed in the disclosure.

In the description of embodiments of the disclosure, certain detailed explanations of related art are omitted when it is deemed that they may unnecessarily obscure the essence of the disclosure. Also, numbers (e.g., a first, a second, and the like) used in the description of the embodiments of the disclosure are merely identifier codes for distinguishing one element from another.

Also, in the present specification, it will be understood that when elements are "connected" or "coupled" to each other, the elements may be directly connected or coupled to each other, or may be indirectly connected or coupled to each other, for example connected or coupled to each other with an intervening element therebetween, unless specified otherwise.

In the present specification, regarding an element represented as a "unit" or a "module", two or more elements may be combined into one element or one element may be divided into two or more elements according to subdivided functions. In addition, each element described hereinafter may additionally perform some or all of functions performed by another element, in addition to main functions of itself, and some of the main functions of each element may be performed entirely by another component.

As is traditional in the field, embodiments may be described and illustrated in terms of blocks which carry out a described function or functions. These blocks, which may be referred to herein as units or modules or the like, or by names such as driver, controller, device, engine, or the like, may be physically implemented by analog or digital circuits such as logic gates, integrated circuits, microprocessors, microcontrollers, memory circuits, passive electronic components, active electronic components, optical components, hardwired circuits, or the like, and may be driven by firmware and software. The circuits may, for example, be embodied in one or more semiconductor chips, or on substrate supports such as printed circuit boards and the like. Circuits included in a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks. Likewise, the blocks of the embodiments may be physically combined into more complex blocks.

Also, in the present specification, a 'frame' may be a still image. For example, a 'frame' may include a still image constituting a moving image (or a video). Also, in the present specification, a 'sample' refers to data assigned to a sampling position of a frame or a feature map, i.e., data to be processed. For example, samples may be pixel values in a frame of a spatial domain. A unit including at least one sample may be defined as a block.

Also, in the present specification, a 'current sample' may refer to a specific sample included in a current frame to be processed, or a sample to be processed from among samples included in a current frame. A 'collocated sample' refers to a sample located at the same location as a current sample from among samples included in a frame (e.g., a previous frame, a next frame, an output frame, or a feature map) other than a current frame.

Also, in the present specification, a 'neural network' may refer to an artificial intelligence model simulating the neurons of brain, and is not limited to a neural network model using a specific algorithm.

Also, in the present specification, a 'weight value' may refer to a value used in a calculation process of each layer of a neural network, and may be used to, for example, apply an input value to a certain formula. While a weight value is generally interchangeably used with a weight, in the disclosure, in order to be distinguished from a weight derived in a weight derivation process, for example weight derivation process 230 of FIG. 1, described below, a weight used in a calculation process of a neural network may be referred to as a weight value. A weight value that is a value set as a result of training may be updated through separate training data when necessary.

Hereinafter, embodiments of the disclosure will be described in detail.

FIG. 1 is a diagram illustrating a configuration of an image processing apparatus 100, according to an embodiment of the disclosure.

The image processing apparatus 100 includes a memory 110 and a processor 130.

The image processing apparatus 100 may be implemented as a device having an image processing function such as a server, a television, a camera, a mobile phone, a tablet computer, or a notebook computer.

Although the memory 110 and the processor 130 are individually illustrated in FIG. 1, the memory 110 and the processor 130 may be implemented through one hardware module (e.g., a chip).

The processor 130 may be implemented as a dedicated processor for neural network-based image processing. In embodiments, the processor 130 may be implemented through a combination of software and a general-purpose processor such as an application processor (AP), a central processing unit (CPU), or a graphics processing unit (GPU). The dedicated processor may include a memory for performing an embodiment of the disclosure, or may include a memory processor for using an external memory.

The processor 130 may include a plurality of processors. In this case, the processor 130 may be implemented through a combination of dedicated processors, or may be implemented through a combination of software and a plurality of general-purpose processors such as APs, CPUs, or GPUs.

The processor 130 may include at least one arithmetic logic unit (ALU) for a convolution operation described below. For a convolution operation, the ALU may include a multiplier that performs a multiplication operation between sample values and an adder that adds result values of the multiplication operation.

The memory 110 may store one or more instructions for processing consecutive frames. In an embodiment of the disclosure, the memory 110 may store a neural network used to generate an output frame. When the neural network is implemented as a dedicated hardware chip for artificial intelligence or is implemented as a part of an existing general-purpose processor (e.g., a CPU or an AP) or a dedicated graphics processor (e.g., a GPU), the neural network may be not stored in the memory 110.

The processor 130 obtains consecutive output frames by sequentially processing the consecutive frames according to the instructions stored in the memory 110. The term 'consecutive frames' may refer to frames representatively constituting a moving image. However, the consecutive frames of the disclosure do not need to constitute one moving image. In other words, still images that are individually captured may be processed by the image processing apparatus 100 according to a pre-determined order, an arbitrary order, or an order set by a user.

As shown in FIG. 1, the image processing apparatus 100 may obtain a first output frame $Y_1$ through an $n^{th}$ output frame $Y_n$ by sequentially processing a first frame $X_1$ through an $n^{th}$ frame $X_n$. In embodiments, an index t as shown for example in the expression $X_t$, may indicate an order in which frames are processed by the image processing apparatus 100.

The image processing apparatus 100 may obtain the first output frame $Y_1$ through the $n^{th}$ output frame $Y_n$ through a pre-trained neural network. The neural network may be pre-trained to increase a resolution, remove noise, increase a dynamic range, or improve image quality.

For example, when the neural network is trained to increase a resolution of a frame, the image processing apparatus 100 may process the first frame $X_1$ through the $n^{th}$ frame $X_n$ based on the neural network to obtain the first output frame $Y_1$ through the $n^{th}$ output frame $Y_n$ having a resolution higher than a resolution of the first frame $X_1$ through the $n^{th}$ frame $X_n$. There may be various methods of training the neural network to increase a resolution of a frame. For example, the neural network may be trained by calculating loss information by comparing an output frame for training obtained as a result of processing a frame for training with a labeled frame having a pre-increased resolution, and minimizing the calculated loss information. As a result of training the neural network, weight values used in layers in the neural network may be updated.

In another example, when the neural network is trained to remove noise of a frame, the image processing apparatus 100 may process the first frame $X_1$ through the $n^{th}$ frame $X_n$ based on the neural network to obtain the first output frame $Y_1$ through the $n^{th}$ output frame $Y_n$ having noise less than that of the first frame $X_1$ through the $n^{th}$ frame $X_n$. There may be various methods of training the neural network to remove noise of a frame. For example, the neural network may be trained by calculating loss information by comparing an output frame for training which is obtained as a result of processing a frame for training with a labeled frame from which noise is pre-removed, and minimizing the calculated loss information.

The neural network may be trained through supervised learning, unsupervised learning, or reinforcement learning.

According to an embodiment of the disclosure, when a current frame that is a current processing target from among consecutive frames is processed, a previous frame is also used. That is, as shown in FIG. 1, the first frame $X_1$ is also input to the image processing apparatus 100 when the second frame $X_2$ is to be processed. As described below, the first output frame $Y_1$ obtained as a result of processing the first frame $X_1$ and a feature map obtained during processing of the first frame $X_1$ may also be input to the image processing apparatus 100 along with the second frame $X_2$.

The reason why a previous frame is input to the image processing apparatus 100 when a current frame is processed is to consider a temporal correlation between consecutive frames. When information of the previous frame, for example, sample values of the previous frame, is reflected in processing of the current frame, a better result may be expected than when only the current frame is processed based on the neural network.

However, when the previous frame is used as it is, an error may occur in a location of an object included in a current output frame. This is because locations of the object commonly included in the previous frame and the current frame captured at different points of time may be different from each other. In other words, when the common object is located at different points in the current frame and the previous frame, a location of the object included in the previous frame may be reflected during processing of the current frame, and thus a location of the object included in the current output frame may be different from that in the current frame.

Also, when the object moves, the object existing in the previous frame may be occluded in the current frame. When the object is occluded, this may mean that the whole or a part of the object existing in the previous frame is not included in the current frame. For example, when the object included in the previous frame may be hidden by another object in the current frame, or an image of the object may be not captured by a camera when an image of the current frame is captured. The object of the previous frame occluded in the current frame may be not helpful in processing the current frame.

Accordingly, although the image processing apparatus 100 according to an embodiment of the disclosure also uses the previous frame during processing of the current frame in order to consider a temporal correlation between the current frame and the previous frame, the image processing apparatus 100 may not use the previous frame as it is, but instead, uses a prediction frame generated from the previous frame to process the current frame.

Also, the image processing apparatus 100 may determine to what extent samples of the prediction frame are to be used in a process of processing the current frame, and may accordingly gate the prediction frame.

In embodiments, the image processing apparatus 100 may further include a display, or may be connected to a separate display apparatus. At least one of consecutive output frames generated by the image processing apparatus 100 may be reproduced on the display or the display apparatus. When necessary, at least one of the output frames may be post-processed, and then may be reproduced on the display or the display apparatus.

According to an implementation example, the image processing apparatus 100 may encode at least one of the output frames through an image compression method using frequency conversion. The image compression method using frequency conversion may include a process of generating prediction data by predicting an output frame, a process of generating residual data corresponding to a difference between the output frame and the prediction data, a process of transforming the residual data that is a spatial domain component into a frequency domain component, a process of quantizing the residual data transformed into the frequency domain component, and a process of entropy encoding the quantized residual data. The image compression method may be implemented through one of image processing methods using frequency conversion such as MPEG-2, H.264 advanced video coding (AVC), MPEG-4, high efficiency video coding (HEVC), VC-1, VP8, VP9, and AOMedia Video 1 (AV1).

Encoded data or a bitstream generated by encoding the output frame may be transmitted to an external device through a network, or may be stored in a data storage medium such as a magnetic medium (e.g., hard disk, floppy disk, or a magnetic tape), an optical recording medium (e.g., a compact disc read-only memory (CD-ROM) or a digital versatile disk (DVD)), or a magneto-optical medium (e.g., a floptical disk).

An example of a process, performed by the image processing apparatus 100, of processing a current frame $X_t$ will be described in detail with reference to FIG. 2.

The image processing apparatus 100 obtains data to be input to a neural network 250 through a motion prediction process 210, a motion compensation process 220, a weight derivation process 230, and a gating process 240.

First, the motion prediction process 210 is a process of determining a motion vector between samples of the current frame $X_t$ and samples of a previous frame $X_{t-1}$. A motion vector indicates a relative positional relationship of the same or similar sample existing in the previous frame $X_{t-1}$ and the current frame $X_t$. For example, when a specific sample is located at coordinates (a, b) in the previous frame $X_{t-1}$ and is located at coordinates (c, d) in the current frame $X_t$, a motion vector of the specific sample may be expressed as (c-a, d-b). As described below, in an embodiment of the disclosure, a motion vector may be expressed as a filter kernel for a convolution operation.

The image processing apparatus 100 identifies, in the previous frame $X_{t-1}$, prediction samples corresponding to the samples of the current frame $X_t$ through the motion prediction process 210. In detail, the image processing apparatus 100 may search which samples of the previous frame $X_{t-1}$ are respectively similar to the samples of the current frame $X_t$, and may identify the searched samples in the previous frame $X_{t-1}$ as prediction samples of the samples in the current frame $X_t$. For example, when a current sample of the current frame $X_t$ is most similar to a sample at the right of a sample at the same location (i.e., a collocated sample) as the current sample from among the samples of the previous frame $X_{t-1}$, the image processing apparatus 100 may identify the sample at the right of the collocated sample as a prediction sample of the current sample.

In an embodiment of the disclosure, the image processing apparatus 100 may perform the motion prediction process 210 through a convolution operation, examples of which will be described with reference to FIGS. 4 through 7.

The image processing apparatus 100 uses, in the motion compensation process 220, a relative positional relationship between the samples of the current frame $X_t$ and the prediction samples in the previous frame $X_{t-1}$ corresponding to the samples of the current frame $X_t$ as a motion vector.

The motion compensation process 220 is a process of obtaining a prediction frame $X_{t\_pred}$ that is a prediction version of the current frame $X_t$ by changing sample values of the samples of the previous frame $X_{t-1}$.

The image processing apparatus 100 may obtain the prediction frame $X_{t\_pred}$ by changing the sample values of the previous frame $X_{t-1}$ according to sample values of the prediction samples. In detail, samples values of collocated samples of the previous frame $X_{t-1}$ at the same locations as the samples of the current frame $X_t$ may vary according to the sample values of the prediction samples. For example, when a prediction sample of a current sample located at the upper left of the current frame $X_t$ is located at the right of a collocated sample of the previous frame $X_{t-1}$, a sample value of the collocated sample of the previous frame $X_{t-1}$ may vary according to a sample value located at the right (i.e., a sample value of the prediction sample).

The weight derivation process 230 may be a process of determining to what extent samples of the prediction frame $X_{t\_pred}$ are helpful in processing the current frame $X_t$ or a degree of contribution of samples in the prediction frame $X_{t\_pred}$ in a process of processing the current frame $X_t$.

Weights to be applied to the samples of the prediction frame $X_{t\_pred}$ are derived through the weight derivation process 230. In processing the current frame $X_t$, a high weight is derived for a sample having a high degree of contribution, and a low weight is derived for a sample having a low degree of contribution.

A weight may be based on a difference value between the sample values of the samples of the current frame $X_t$ and the sample values of the prediction samples corresponding to the sample values of the samples of the current frame $X_t$. As the difference value increases, the weight decreases; and as the difference value decreases, the weight increases. Because, when a difference value is large, this may mean that a sample value of a prediction sample does not have a high degree of contribution in processing a sample of the current frame $X_t$, a small weight is calculated.

The gating process 240 is a process of applying a weight to the samples of the prediction frame $X_{t\_pred}$. Sample values of the prediction frame $X_{t\_pred}$ vary according to degrees of contribution of the samples of the prediction frame $X_{t\_pred}$.

In an embodiment of the disclosure, in the gating process 240, a weight may be multiplied by samples values of the samples of the prediction frame $X_{t\_pred}$. While a sample value of a sample multiplied by a weight of 1 is maintained, a sample value of a sample multiplied by a weight less than 1 is reduced.

As described with reference to FIG. 1, the image processing apparatus 100 may further use a previous output frame $Y_{t-1}$ corresponding to the previous frame $X_{t-1}$ and a previous feature map $S_{t-1}$ obtained during a process of processing the previous frame $X_{t-1}$ when the current frame $X_t$ is processed.

The previous output frame $Y_{t-1}$ and the previous feature map $S_{t-1}$ may be output by the neural network 250 in a process of processing the previous frame $X_{t-1}$. The previous output frame $Y_{t-1}$ may be output from a last layer of the neural network 250, and the previous feature map $S_{t-1}$ may be output from a previous layer of the last layer of the neural network 250. A previous layer of a last layer may refer to a previous layer directly connected to the last layer, or a previous layer with one or more layers between the last layer and the previous layer.

Because the previous output frame $Y_{t-1}$ and the previous feature map $S_{t-1}$ have characteristics of the previous frame $X_{t-1}$, the motion compensation process 220 and the gating process 240 may be applied. That is, through the motion compensation process 220, a prediction output frame $Y_{t\_pred}$ that is a prediction version of a current output frame $Y_t$ and a prediction feature map $S_{t\_pred}$ that is a prediction version of a current feature map $S_t$ may be obtained from the previous output frame $Y_{t-1}$ and the previous feature map $S_{t-1}$.

The motion compensation process 220 applied to the previous output frame $Y_{t-1}$ and the previous feature map $S_{t-1}$ may be the same as the motion compensation process 220 applied to the previous frame $X_{t-1}$. In detail, the prediction output frame $Y_{t\_pred}$ and the prediction feature map $S_{t\_pred}$ may be generated by changing a sample value of a collocated sample of the previous output frame $Y_{t-1}$ and the previous feature map $S_{t-1}$ according to a positional relationship (i.e., a motion vector) between a current sample of the current frame $X_t$ and a prediction sample in the previous frame $X_{t-1}$. For example, when a prediction sample of the current sample of the current frame $X_t$ is located at the right of a collocated sample of the previous frame $X_{t-1}$, the sample value of the collocated sample of the previous output frame $Y_{t-1}$ and the previous feature map $S_{t-1}$ may vary according to a sample value located at the right.

As weights obtained through the weight derivation process 230 are applied to samples of the prediction output frame $Y_{t\_pred}$ and the prediction feature map $S_{t\_pred}$ in the gating process 240, a weighted prediction output frame $Y'_{t\_pred}$ and a weighted prediction feature map $S'_{t\_pred}$ may be obtained.

Figure 2:
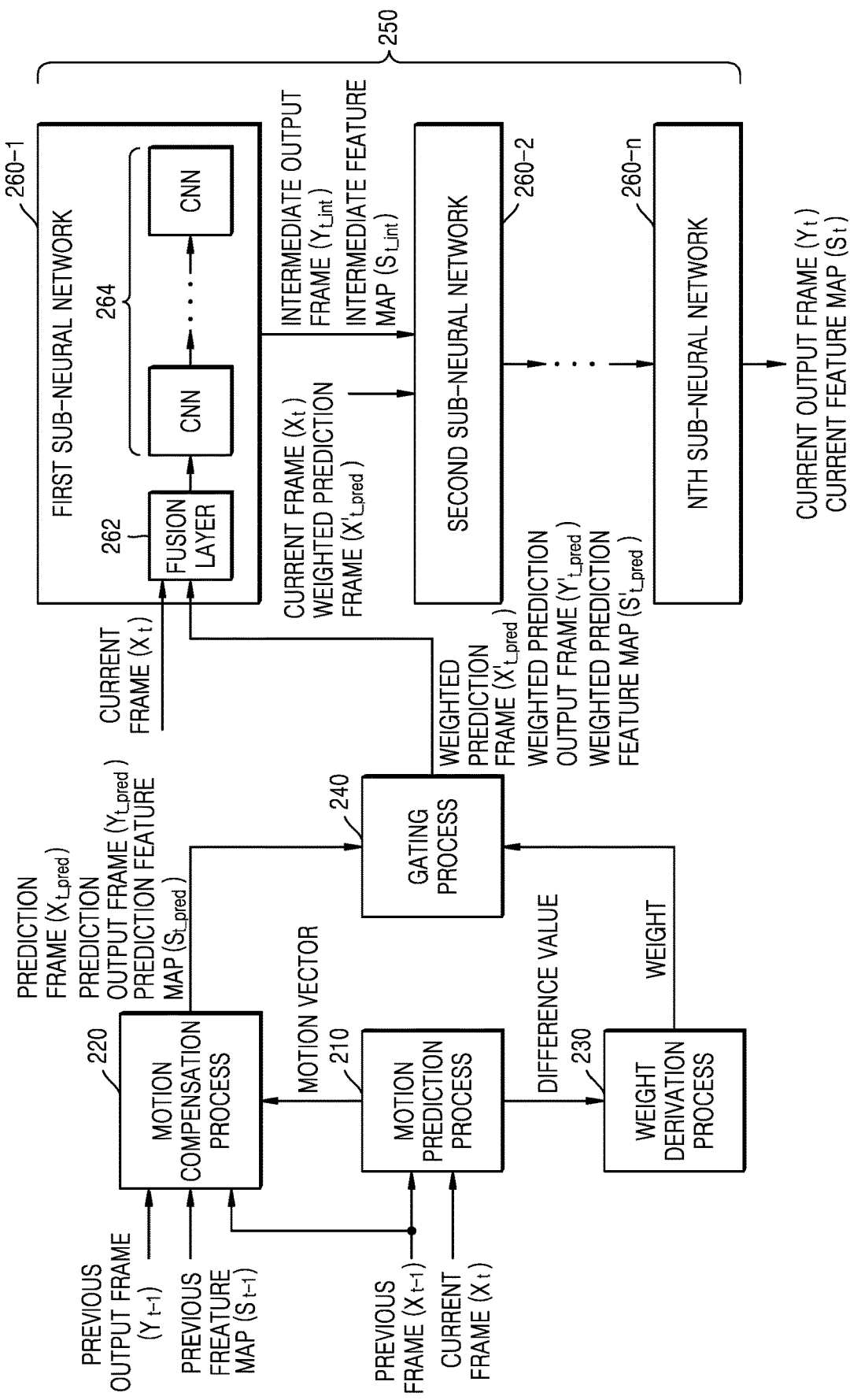
FIG. 2 is a diagram illustrating a process of processing a current frame, according to an embodiment.

Although both the previous output frame $Y_{t-1}$ and the previous feature map $S_{t-1}$ are used in a process of processing the current frame $X_t$ in FIG. 2, this is merely an example, and the previous output frame $Y_{t-1}$ and the previous feature map $S_{t-1}$ may be not used in a process of processing the current frame $X_t$. That is, only the previous frame $X_{t-1}$ may be considered in a process of processing the current frame $X_t$. In another example, only one of the previous output frame $Y_{t-1}$ and the previous feature map $S_{t-1}$ may be used in a process of processing of the current frame $X_t$.

A weighted prediction frame $X'_{t\_pred}$, the weighted prediction output frame $T'_{t\_pred}$, and the weighted prediction feature map $S'_{t\_pred}$ derived through the gating process 240 and the current frame $X_t$ are input to the neural network 250. The current output frame $Y_t$ corresponding to the current frame $X_t$ is obtained as a processing result of the neural network 250.

The neural network 250 according to an embodiment of the disclosure may include a convolution layer. In the convolution layer, convolution processing is performed on input data by using a filter kernel. An example of convolution processing for a convolution layer will be described with reference to FIG. 3.

The neural network 250 may include one or more sub-neural networks, for example, first through $n^{th}$ sub-neural networks 260-1, . . . , and 260-n. Although the first through $n^{th}$ sub-neural networks 260-1, . . . , and 260-n are included in the neural network 250 in FIG. 2, this is merely an example, and only one sub-neural network, for example, the first sub-neural network 260-1, may be included in the neural network 250. When one sub-neural network is included in the neural network 250, it may mean that the neural network 250 includes a fusion layer 262 and a plurality of convolution layers.

The fusion layer is used to fuse the current frame $X_t$ with data output from the gating process 240, that is, the weighted prediction frame $X'_{t\_pred}$, the weighted prediction output frame $T'_{t\_pred}$, and the weighted prediction feature map $S'_{t\_pred}$. Different types of data may be combined through the fusion process.

A result of combining the current frame $X_t$ with the weighted prediction frame $X'_{t\_pred}$, the weighted prediction output frame $T'_{t\_pred}$, and the weighted prediction feature map $S'_{t\_pred}$ is convolution processed by subsequent convolution layers 264. In embodiments, when an element is convolution processed, this may mean that a convolution process is performed on the element.

As a processing result by the first sub-neural network 260-1, an intermediate output frame $Y_{t\_int}$ and an intermediate feature map $S_{t\_int}$ are obtained. The intermediate output frame $Y_{t\_int}$ is output by a last layer included in the first sub-neural network 260-1, and the intermediate feature map $S_{t\_int}$ is output by a previous layer of the last layer included in the first sub-neural network 260-1.

The current frame $X_t$, and the weighted prediction frame $X'_{t\_pred}$, and the intermediate output frame $Y_{t\_int}$ and the intermediate feature map $S_{t\_int}$ output from the first sub-neural network 260-1 are input to the second sub-neural network 260-2. As in the first sub-neural network 260-1, in the fusion layer 262 of the second sub-neural network 260-2, the current frame $X_t$, the weighted prediction frame $X'_{t\_pred}$, the intermediate output frame $Y_{t\_int}$, and the intermediate feature map $S_{t\_int}$ are combined and then are convolution processed. The intermediate output frame $Y_{t\_int}$ and the intermediate feature map $S_{t\_int}$ are output as a processing result by the second sub-neural network 260-2, and the output intermediate output frame $Y_{t\_int}$ and the output intermediate feature map $S_{t\_int}$ are input to the third sub-neural network 260-3. As in the second sub-neural network 260-2, the current frame $X_t$ and the weighed prediction frame $X'_{t\_pred}$ may be further input to the third sub-neural network 260-3. The current output frame $Y_t$ corresponding to the current frame $X_t$ is obtained as a processing result by the last sub-neural network 260-n.

The current frame $X_t$, and the current output frame $Y_t$ and the current feature map $S_t$ output from the last sub-neural network 260-n may be used in a process of processing a next frame $X_{t+1}$.

When the current frame $X_t$ is a first frame of consecutive frames, the previous frame $X_{t-1}$, the previous output frame $Y_{t-1}$, and the previous feature map $S_{t-1}$ may be set to each have a pre-determined sample value (e.g., 0).

Hereinafter, an example of a convolution operation will be described before the motion prediction process 210 and the motion compensation process 220 are described in detail.

Figure 3:
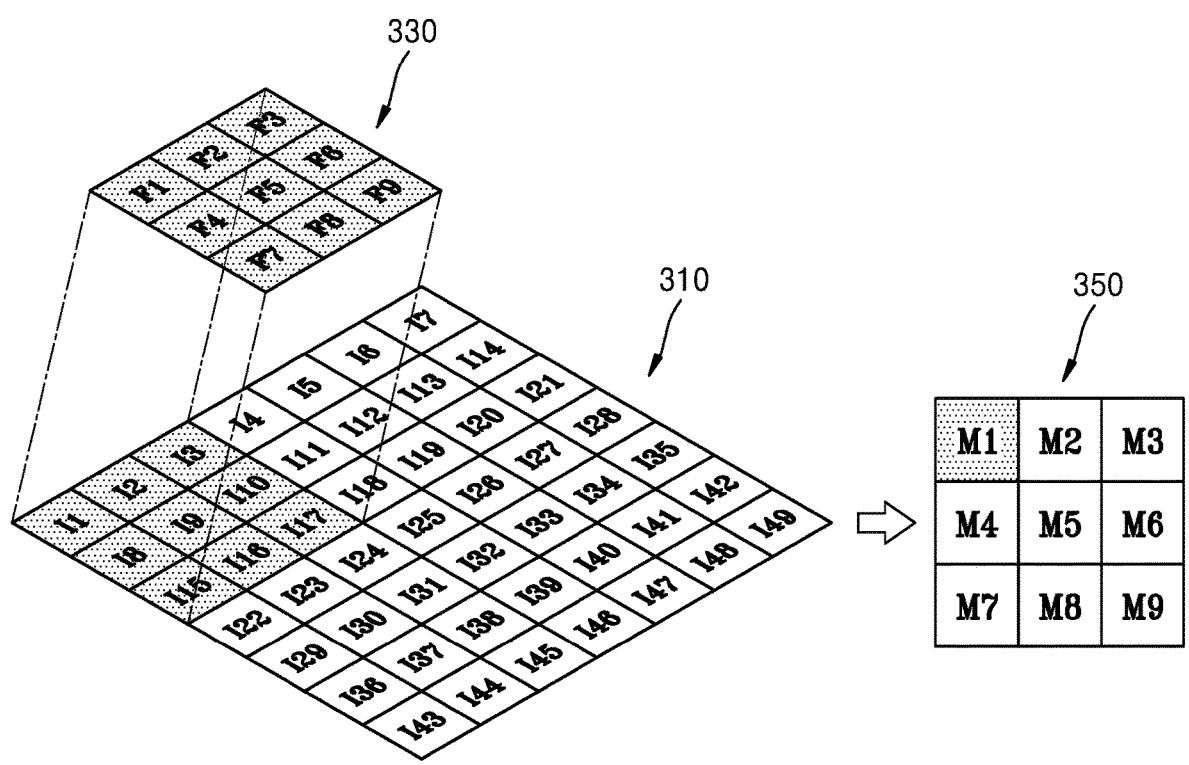
FIG. 3 is a diagram for describing a convolution operation, according to an embodiment.

FIG. 3 is a diagram for describing a convolution operation.

A feature map 350 is generated through a multiplication operation and an addition operation between weight values of a filter kernel 330 used in a convolution layer and sample values in a corresponding frame 310 corresponding to the weight values of the filter kernel 330. The filter kernel 330 has a pre-determined size (3×3 in FIG. 3).

The number of feature maps 350 varies according to the number of filter kernels 330. The number of filter kernels 330 and the number of feature maps 350 may be the same. That is, when one filter kernel 330 is used in a convolution layer, one feature map 350 may be generated, and when two filter kernels 330 are used, two feature maps 350 may be generated.

In FIGS. 3, I1 through I49 in the frame 310 indicate samples of the frame 310, and F1 through F9 in the filter kernel 330 indicate weight values of the filter kernel 330. Also, M1 through M9 in the feature map 350 indicate samples of the feature map 350.

Although the frame 310 includes 49 samples in FIG. 3, this is merely an example. When the frame 310 has a resolution of 4 K, for example, the frame 310 may include 3840×2160 samples.

In a convolution operation, a multiplication operation may be performed between each of sample values of the samples I1, I2, I3, I8, I9, I10, I15, I16, and I17 of the frame 310 and each of the weight values F1, F2, F3, F4, F5, F6, F7, F8, and F9 of the filter kernel 330, and a value obtained by combining (e.g., adding) result values of the multiplication operation may be allocated as a value of the sample M1 of the feature map 350. When a stride of a convolution operation is 2, a multiplication operation may be performed between each of sample values of the samples I3, I4, I5, I10, I11, I12, I17, I18, and I19 of the frame 310 and each of the weight values F1, F2, F3, F4, F5, F6, F7, F8, and F9 of the filter kernel 330, and a value obtained by combining result values of the multiplication operation may be allocated as a value of the sample M2 of the feature map 350.

Because a convolution operation is performed between sample values in the frame 310 and weight values of the filter kernel 330 while the filter kernel 330 moves along a stride until reaching a last sample of the frame 310, the feature map 350 having a certain size may be obtained.

Figure 4:
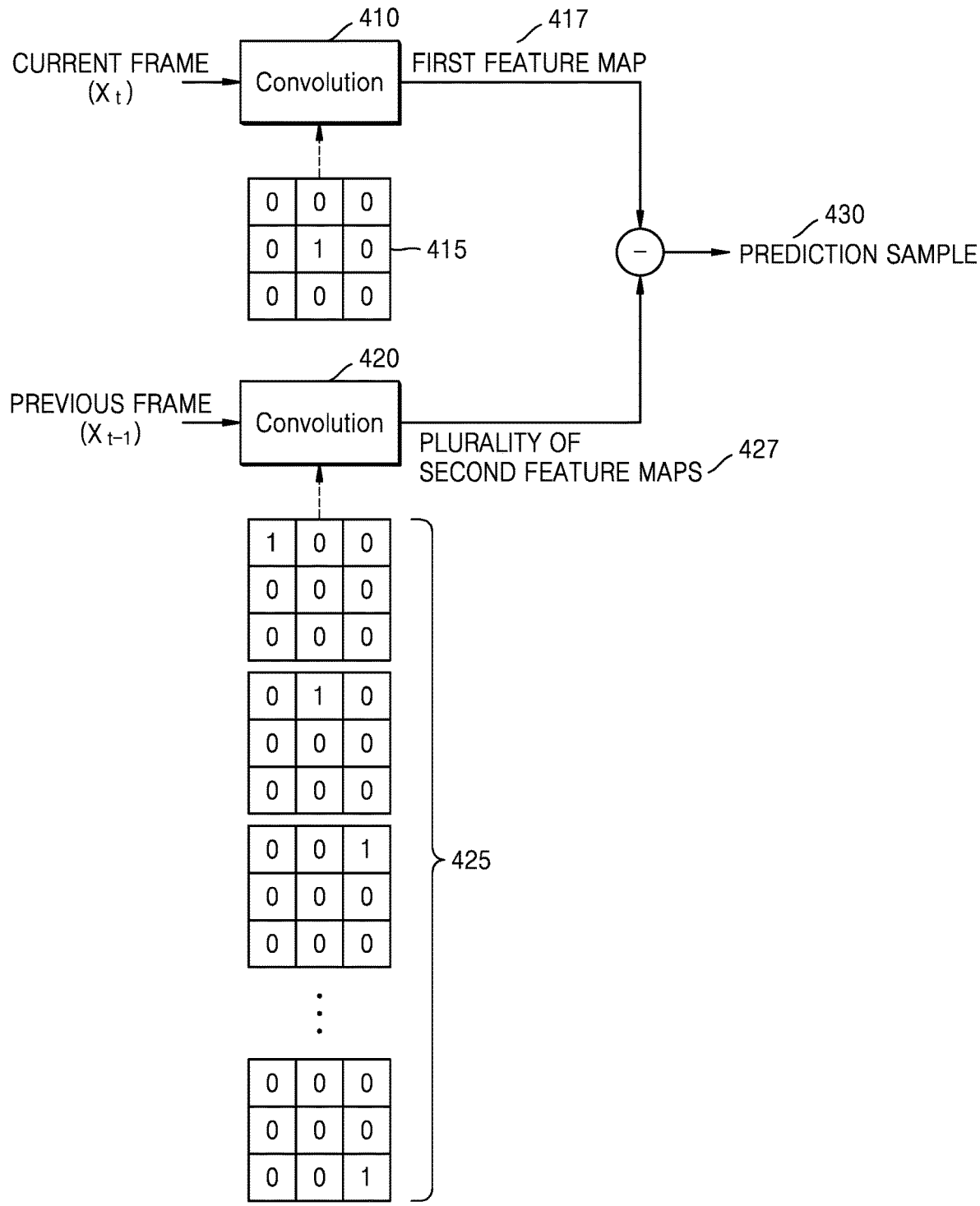
FIG. 4 is a diagram for describing a motion prediction process of FIG. 2.

FIG. 4 is a diagram for describing the motion prediction process 210 of FIG. 2.

In an embodiment of the disclosure, the image processing apparatus 100 may perform motion prediction based on convolution operations 410 and 420 on the current frame $X_t$ and the previous frame $X_{t-1}$.

The image processing apparatus 100 may obtain a first feature map 417 by performing the convolution operation 410 on the current frame $X_t$ by using a first filter kernel 415 that is pre-determined, and may obtain a plurality of second feature maps 427 by performing the convolution operation 420 on the previous frame $X_{t-1}$ by using a plurality of second filter kernels 425 that are pre-determined.

The convolution operation 410 based on the first filter kernel 415 may be sequentially performed on samples of the current frame $X_t$, and the convolution operation 420 based on the plurality of second filter kernels 425 may be sequentially performed on samples of the previous frame $X_{t-1}$.

As the convolution operation 410 based on the first filter kernel 415 is performed on a current sample of the current frame $X_t$ and neighboring samples of the current sample, a sample value of a collocated sample of the first feature map 417 may be obtained. Also, as the convolution operation 420 based on the plurality of second filter kernels 425 is performed on a collocated sample of the previous frame $X_{t-1}$ and neighboring samples of the collocated sample, a sample value of a collocated sample of the plurality of second feature maps 427 may be obtained.

Each of the first filter kernel 415 and the plurality of second filter kernels 425 may have a certain size. For example, although each of the first filter kernel 415 and the plurality of second filter kernels 425 may have a size of 3×3 as shown in FIG. 4, the disclosure is not limited thereto. According to an implementation example, each of the first filter kernel 415 and the plurality of second filter kernels 425 may have a size of 4×4 or 5×5.

The first feature map 417 having the same size as the current frame $X_t$ may be obtained as a result of the convolution operation 410 for the current frame $X_t$ based on the first filter kernel 415. The current frame $X_t$ may be padded to obtain the first feature map 417 having the same size as the current frame $X_t$ through the convolution operation 410. The padding refers to a process of allocating a sample having a pre-determined sample value (e.g., 0) outside at least one of a left boundary, an upper boundary, a right boundary, or a lower boundary of the current frame $X_t$. The number of samples of the current frame $X_t$ increases through the padding.

In the first filter kernel 415, a sample corresponding to a current sample may have a pre-set first value, and the remaining samples may have a value of 0. Although the first filter kernel 415 has a value of 1 and a value of 0 in FIG. 4, 1 is merely an example of the pre-set first value.

The first filter kernel 415 may be applied to a current sample of the current frame $X_t$ and neighboring samples of the current sample. A sample corresponding to the current sample refers to a sample applied to a multiplication operation with the current sample from among samples of the first filter kernel 415. FIG. 4 shows that a center sample of the first filter kernel 415 has a weight value of 1, which considers a case where the current frame $X_t$ is padded in a left direction of a left boundary and in an upper direction of an upper boundary. For example, when the convolution operation 410 is performed on an upper left sample of the current frame $X_t$, a multiplication operation may be performed between the upper left sample and the center sample of the first filter kernel 415 only when the current frame $X_t$ is padded only in the left or upper directions. Accordingly, when the current frame $X_t$ is not padded in the left and upper directions, an upper left sample of the first filter kernel 415 has a value of 1.

When a sample corresponding to a current sample from among samples of the first filter kernel 415 has the pre-set first value, samples of the first feature map 417 are calculated by multiplying sample values of samples of the current frame $X_t$ by the first value. Accordingly, when the first value is 1, sample values of the first feature map 417 are the same as the sample values of the current frame $X_t$.

According to an implementation example, in a motion prediction process, the convolution operation 410 for the current frame $X_t$ may be omitted. This is because, when a sample of the first filter kernel 415 corresponding to a current sample has a value of 1 and the other samples have a value of 1, the first feature map 417 obtained as a result of the convolution operation 410 is the same as the current frame $X_t$. Accordingly, prediction samples 430 may be identified through comparison between the current frame $X_t$ and second feature maps 427 obtained as a result of the convolution operation 420 for the previous frame $X_{t-1}$.

The plurality of second filter kernels 425 used in the convolution operation 420 for the previous frame $X_{t-1}$ have a value of 0 and a pre-set second value. The pre-set second value may be the same as the pre-set first value. For example, both the first value and the second value may be 1. When the first value and the second value are the same, the first filter kernel 415 may correspond to any one of the plurality of second filter kernels 425.

According to an implementation example, the pre-set second value may be a value with a sign different from that of the pre-set first value. For example, when the first value is 1, the second value may be −1.

Any one of samples of the plurality of second filter kernels 425 may have a pre-set second value, and the remaining samples may have a value of 0. A location of a sample having the second value may be different for each of the plurality of second filter kernels 425. As shown in FIG. 4, in any one second filter kernel 425, an upper left sample may have the second value, and in another second filter kernel 425, a right sample of the upper left sample may have the second value.

The number of second filter kernels 425 may vary according to a size of the second filter kernels 425. When a size of the second filter kernels 425 is 3×3, the number of second filter kernels 425 may be 9. This is because a location of a sample having the second value is different for each second filter kernel 425.

The second feature maps 427 are obtained through the convolution operation 420 for the previous frame $X_{t-1}$ using the second filter kernels 425. The number of second feature maps 427 is the same as the number of second filter kernels 425.

The second filter kernels 425 may be used to extract a sample value of any one of a collocated sample of the previous frame $X_{t-1}$ and neighboring samples of the collocated sample. For example, the second filter kernel in which an upper left sample has the second value may be used to extract a sample value of a sample located at the upper left of a collocated sample of the previous frame $X_{t-1}$, and the second filter kernel in which an upper right sample has the second value may be used to extract a sample value of a sample at the upper right of a collocated sample of the previous frame $X_{t-1}$.

The image processing apparatus 100 may identify the prediction samples 430 of samples in the current frame $X_t$ by comparing sample values of the first feature map 417 with sample values of the second feature maps 427. The image processing apparatus 100 may identify a sample that is most similar to a sample value of a certain location of the first feature map 417 from among sample values of a certain location of the second feature maps 427, and may identify a sample in the previous frame $X_{t-1}$ corresponding to the identified sample as the prediction sample 430 of a current sample of a certain location.

For example, when a current sample is a center sample in the current frame $X_t$, a sample value that is most similar to a sample value of a center sample of the first feature map 417 from among sample values of center samples of the second feature maps 427 is identified. A sample in the previous frame $X_{t-1}$ corresponding to the identified sample value may be identified as the prediction sample 430 of the current sample. When a sample value of a center sample of the second feature map 427 generated based on the second filter kernel 425 in which an upper right sample has the second value is most similar to a sample value of a center sample of the first feature map 417, a sample located at the upper right of a center sample of the previous frame $X_{t-1}$ may be determined as the prediction sample 430 of the current sample.

An example of a motion prediction process will be described with reference to FIGS. 5 through 7.

Figure 5:
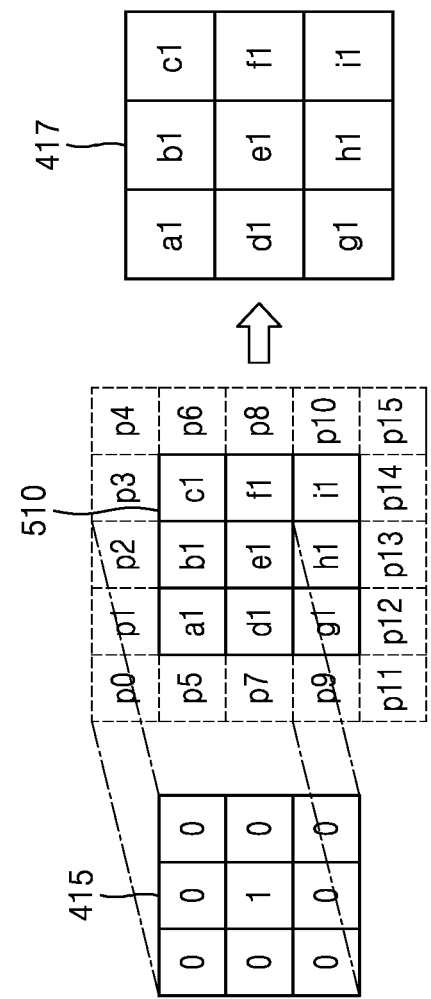
FIG. 5 is a diagram illustrating a convolution operation applied to a current frame for motion prediction, according to an embodiment.

FIG. 5 is a diagram illustrating a convolution operation applied to a current frame 510 for motion prediction.

In the first filter kernel 415, a center sample corresponding to a current sample has a value of 1, and the remaining samples have a value of 0.

The current frame 510 may have samples a1, b1, c1, d1, e1, f1, g1, h1, and i1. Although a size of the current frame 510 is 3×3 in FIG. 5, this is for convenience of explanation, and a size of the current frame 510 may be changed in various ways.

The current frame 510 may be padded in left, upper, right, and lower directions in order to generate the first feature map 417 having the same size as the current frame 510. Through the padding, samples p0 through p15 having pre-determined sample values in the left, upper, right, and lower directions of the current frame 510 may be added to the current frame 510.

A stride of a convolution operation may be set to 1 tin order to sequentially perform a convolution operation on samples of the current frame 510.

First, a sample value of a first sample (i.e., an upper left sample) of the first feature map 417 is derived through a convolution operation of weight values of the first filter kernel 415 and the sample p0, the sample p1, the sample p2, the sample p5, the sample a1, the sample b1, the sample p7, the sample d1, and the sample e1 of the current frame 510. Because the center sample of the first filter kernel 415 has a value of 1 and the remaining samples have a value of 0, the sample value of the upper left sample of the first feature map 417 is derived to be a1.

A sample value of a second sample (i.e., a sample located at the right of the upper left sample) of the first feature map 417 is derived through a convolution operation of the weight values of the first filter kernel 415 and the sample p1, the sample p2, the sample p3, the sample a1, the sample b1, the sample c1, the sample d1, the sample e1, and the sample f1 of the current frame 510. The sample value of the second sample of the first feature map 417 is derived to be b1 through the convolution operation.

A convolution operation based on the samples of the current frame 510 and the first filter kernel 415 is performed until the first filter kernel 415 reaches a last sample of the current frame 510, that is, the sample i1. When the first filter kernel 415 reaches the sample i1, a sample value of a last sample of the first feature map 417 is derived to be i1 through a convolution operation of the weight values of the first filter kernel 415 and the sample e1, the sample f1, the sample p8, the sample h1, the sample i1, the sample p10, the sample p13, the sample p14, and the sample p15 of the current frame 510.

Referring to FIG. 5, it is found that, when a center sample of the first filter kernel 415 has a value of 1, sample values of the current frame 510 and sample values of the first feature map 417 are the same. That is, the first filter kernel 415 in which a sample corresponding to a current sample has a value of 1 is used to extract sample values of the current frame 510.

Figure 6:
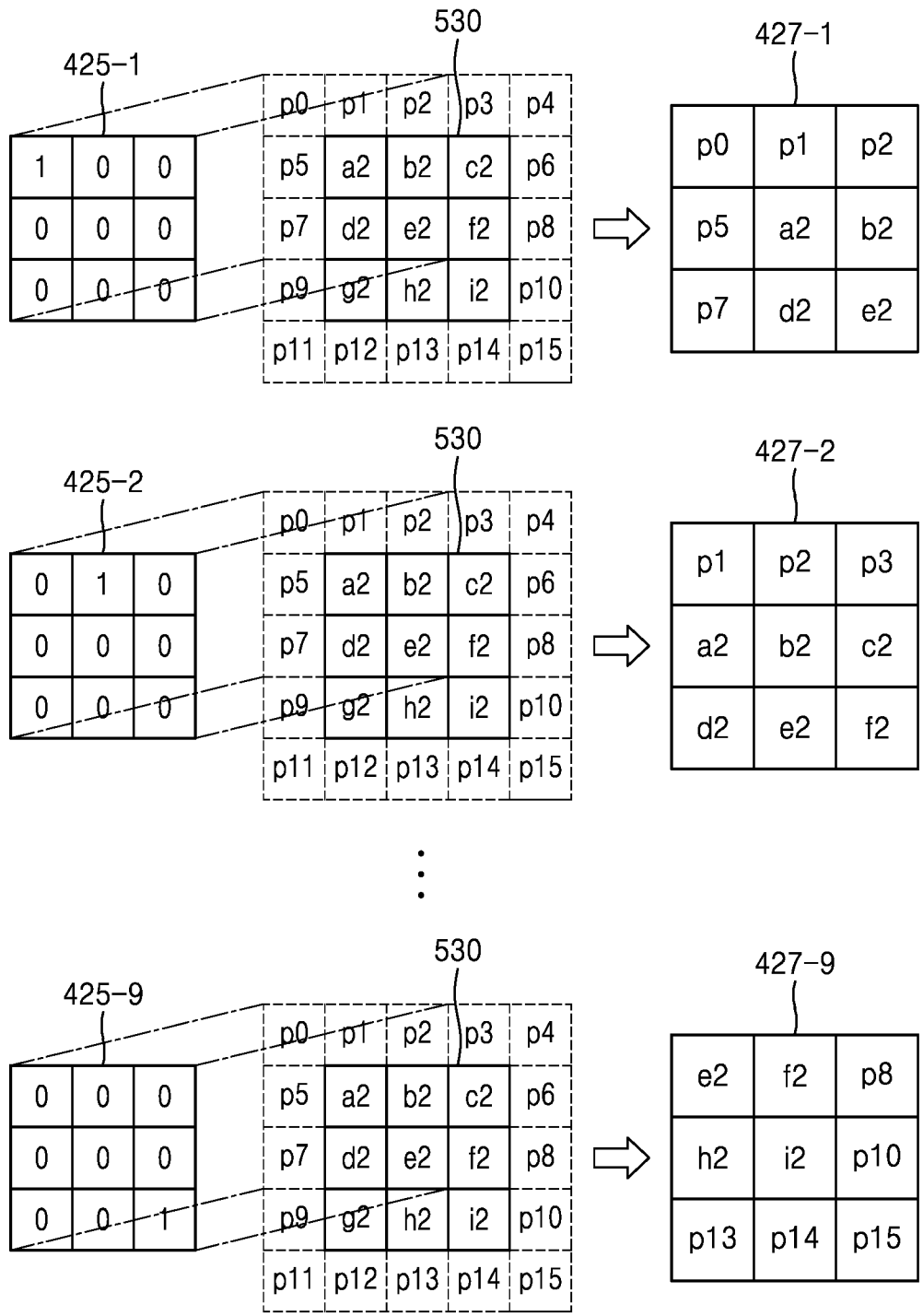
FIG. 6 is a diagram illustrating a convolution operation applied to a previous frame for motion prediction, according to an embodiment.

FIG. 6 is a diagram illustrating a convolution operation applied to a previous frame for motion prediction.

The second filter kernels 425 may include one sample having a value of 1 and the other samples having a value of 0. As described above, a location of a sample having a weight value of 1 may be different for each second filter kernel 425. The second filter kernels 425 may include one sample having a value of −1 and the other samples having a value of 0.

A previous frame 530 may include samples a2, b2, c2, d2, e2, f2, g2, h2, and i2. Although the previous frame 530 has a size of 3×3 in FIG. 6, this is for convenience of explanation, and a size of the previous frame 530 may be changed in various ways.

The previous frame 530 may be padded in left, upper, right, and lower directions in order to generate the second feature maps 427 having the same size as the previous frame 530. Through the padding, samples having pre-determined sample values in the left, upper, right, and lower directions of the previous frame 530 may be added to the previous frame 530.

The second feature maps 427 corresponding to the second filter kernels 425 may be obtained through a convolution operation based on the previous frame 530 and the second filter kernels 425.

The second filter kernels 425 may be referred to as a second filter kernel A 425-1, a second filter kernel B 425-2, through a second filter kernel I 425-9 according to a location of a sample having a value of 1 to distinguish the second filter kernels 425, and the second feature maps 427 are referred to as a second feature map A 427-1, a second feature map B 427-2 through a second feature map I 427-9 to distinguish the second feature maps 427.

A stride of a convolution operation may be set to 1 in order to sequentially perform a convolution operation on samples of the previous frame 530.

First, the second feature map A 427-1 may be obtained through a convolution operation based on the second filter kernel A 425-1 in which an upper left sample has a value of 1 and the previous frame 530. As described above, the second filter kernel A 425-1 may be convolution processed with the previous frame 530 while moving according to the stride of 1. The second filter kernel A 425-1 is used to extract a sample value located at the upper left of the samples of the previous frame 530. Accordingly, the second feature map A 427-1 has a value obtained by multiplying a sample value of samples located at the upper left of the samples of the previous frame 530 by 1. For example, when a current sample is a1, a collocated sample of the previous frame 530 is a2, and a sample value of a collocated sample of the second feature map A 427-1 is derived to be a sample value of p0 located at the upper left of the sample a2.

Next, the second feature map B 427-2 may be obtained through a convolution operation between the previous frame 530 and the second filter kernel B 425-2 in which a sample located at the right of the upper left sample has a value of 1. The second filter kernel B 425-2 is used to extract a sample value located above the samples of the previous frame 530. Accordingly, the second feature map B 427-2 has a value obtained by multiplying a sample value of samples located above the samples (of the previous frame 530 by 1. For example, when a current sample is a1, a collocated sample of the previous frame 530 is a2, and a sample value of a collocated sample of the second feature map B 427-2 is derived to be a sample value of p1 located above the sample a2.

As such, the second feature map A 427-1 through the second feature map I 427-9 may be obtained through a convolution operation of the previous frame 530 and the second filter kernel A 425-1 through the second filter kernel I 425-9.

Figure 7:
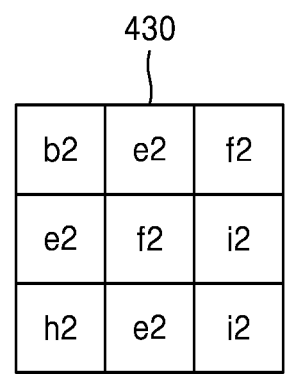
FIG. 7 is a diagram illustrating prediction samples corresponding to samples in a current frame, according to an embodiment.

FIG. 7 is a diagram illustrating the prediction samples 430 corresponding to samples in a current frame.

The image processing apparatus 100 identifies which samples of the second feature maps 427 are most similar to samples in the first feature map 417. In this case, samples located at the same location from among the samples of the second feature maps 427 and the samples of the first feature map 417 are compared. In detail, the image processing apparatus 100 may calculate an absolute value of a difference between a sample value of a sample of a specific location in the first feature map 417 and sample values of samples of a specific location in the second feature maps 427, and may identify a sample value having a smallest absolute value. The image processing apparatus 100 may determine a sample in the previous frame 530 corresponding to the sample value having the smallest absolute value of the difference as a prediction sample.

As described above, when a sign of a first value of one sample of the first filter kernel 415 and a sign of a second value of one sample of the second filter kernel 425 are the same, a difference between a sample value of a sample in the first feature map 417 and sample values of samples in the second feature maps 427 may be calculated through a difference operation. In contrast, when a sign of the first value and a sign of the second value are different from each other, a difference between a sample value of a sample in the first feature map 417 and sample values of samples in the second feature maps 427 may be calculated through a sum operation.

Referring to an upper left sample of the first feature map 417 of FIG. 5, the image processing apparatus 100 may calculate an absolute value of a difference between a sample value of the upper left sample a1 of the first feature map 417 and sample values of upper left samples of the second feature maps 427. For example, |a1-p0| may be calculated between a sample value of the upper left sample a1 of the first feature map 417 and a sample value of the upper left sample p0 of the second feature map A 427-1, and |a1-p1| may be calculated between a sample value of the upper left sample a1 of the first feature map 417 and a sample value of the upper left sample p1 of the second feature map B 427-2. When an absolute value of a difference between a sample value of an upper left sample e2 of the second feature map I 427-9 and a sample value of the upper left sample a1 of the first feature map 417 is the smallest, the sample e2 in the previous frame 530 corresponding to the upper left sample e2 of the second feature map I 427-9 may be determined as a prediction sample of the upper left sample a1 of the current frame 510.

As such, the prediction samples 430 corresponding to respective samples of the current frame 510 may be identified, by comparing sample values of the first feature map 417 with sample values of the second feature maps 427.

In FIG. 7, it is found that prediction samples corresponding to samples of the current frame 510 are determined to be b2, e2, f2, e2, f2, i2, h2, e2, and i2.

Although a motion prediction process has been described with reference to a process of determining a prediction sample in FIGS. 4 through 7, the motion prediction process may be a process of searching for a motion vector. Each of the second filter kernels 425 may be a positional relationship between a current sample and a collocated sample of the previous frame 530 and neighboring samples of the collocated sample of the previous frame 530, that is, a motion vector candidate. In other words, a motion prediction process may be a process of determining a motion vector candidate (any one second filter kernel) indicating a sample that is most similar to a current sample from among multiple motion vector candidates (multiple second filter kernels) as a motion vector of the current sample.

Figure 8:
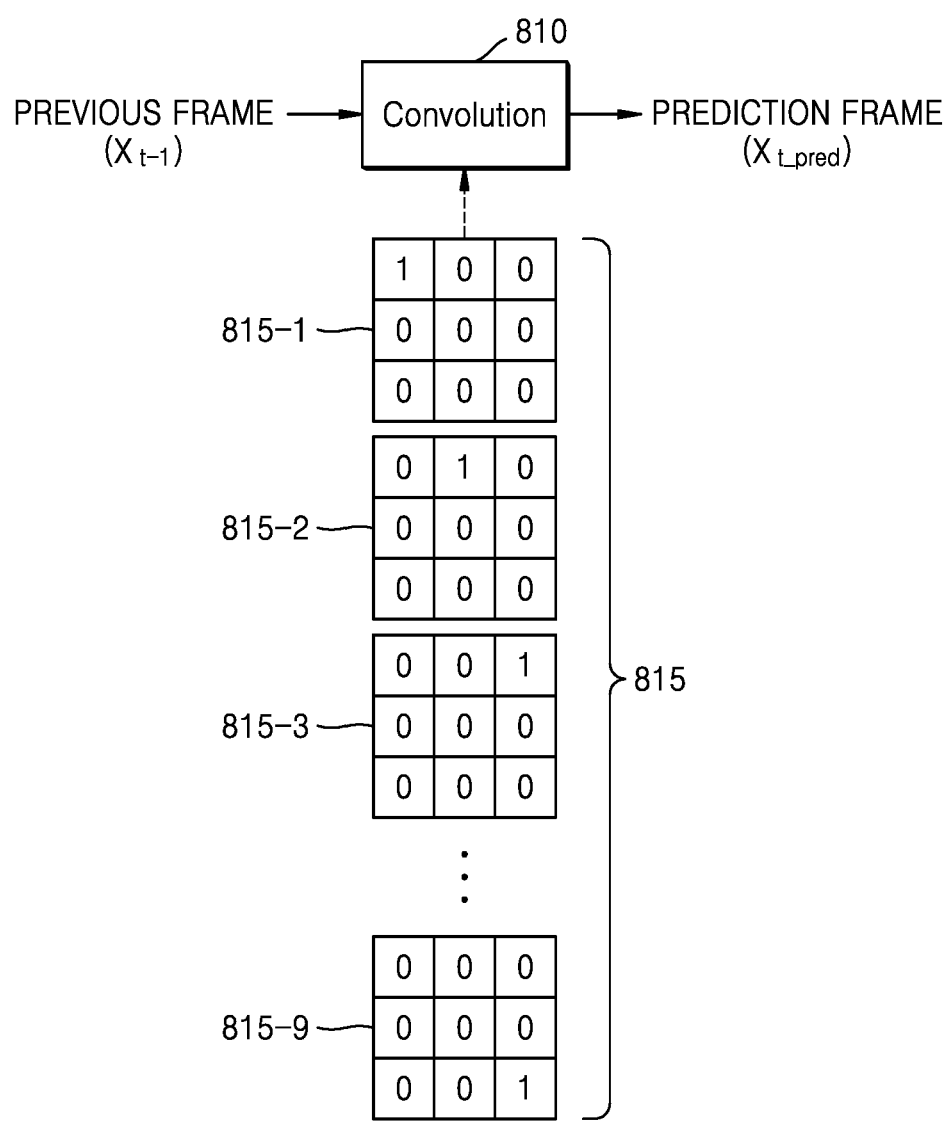
FIG. 8 is a diagram for describing a motion compensation process of FIG. 2, according to an embodiment.

FIG. 8 is a diagram for describing the motion compensation process 220 of FIG. 2.

A motion compensation process is a process of changing sample values of samples of the previous frame $X_{t-1}$ located at the same location as samples of the current frame $X_t$ according to sample values of prediction samples. The prediction frame $X_{t\_pred}$ may be obtained through the motion compensation process.

The image processing apparatus 100 may perform a motion compensation process through a convolution operation, as in a motion prediction process.

The image processing apparatus 100 may select a third filter kernel to be used in motion compensation of each sample of the previous frame $X_{t-1}$ from among a plurality of third filter kernels 815 that are pre-determined, and may apply a convolution operation based on the selected third filter kernel to each sample of the previous frame $X_{t-1}$. In this case, a third filter kernel corresponding to each sample of the previous frame $X_{t-1}$ may be selected.

The plurality of third filter kernels 815 may include a sample having a pre-determined third value and samples having a value of 0, and a location of the sample having the third value may be different for each third filter kernel 815. The third value may be, for example, 1. According to an implementation example, the plurality of second filter kernels 425 used in a motion prediction process may also be used in a motion compensation process.

Figure 9:
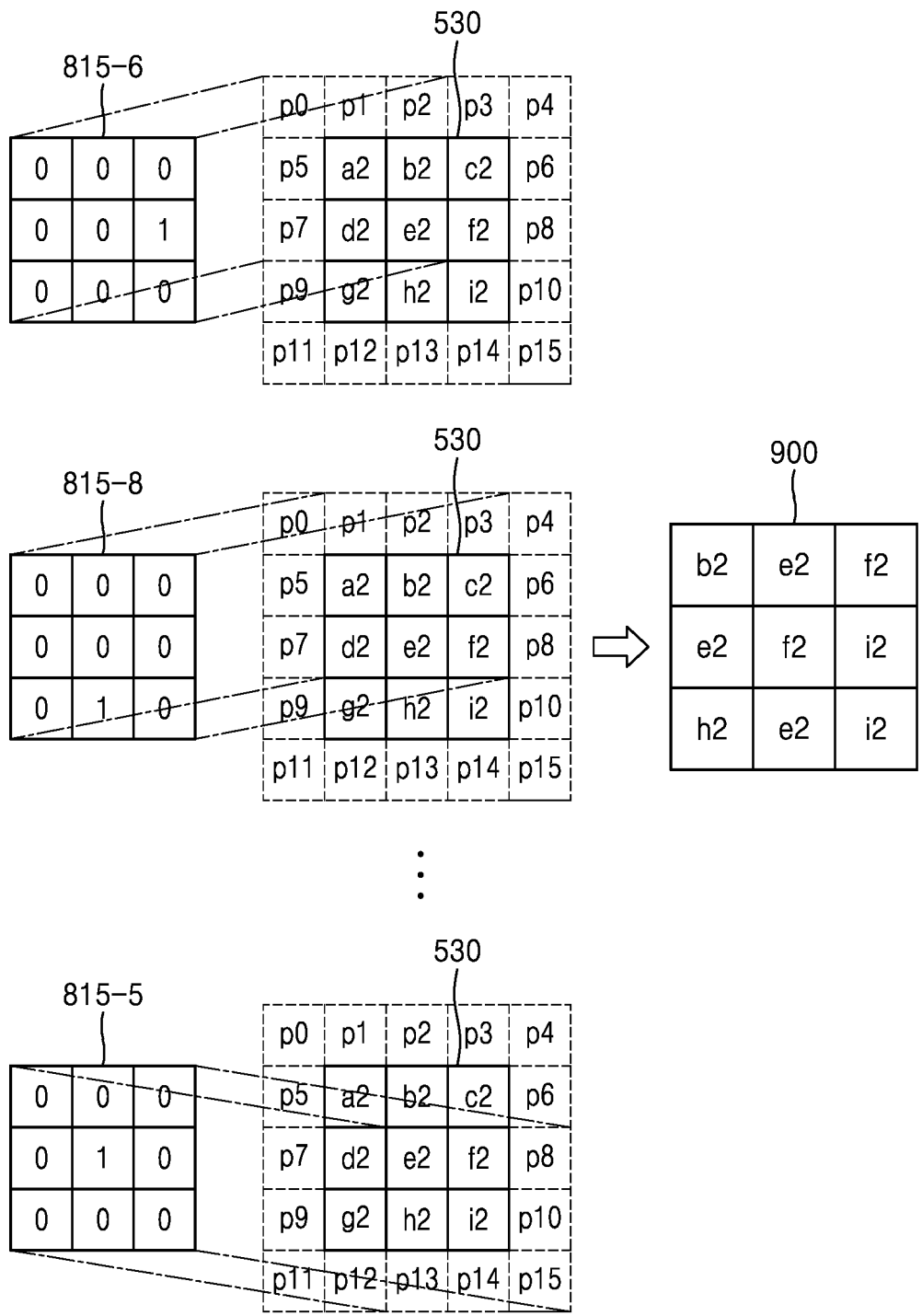
FIG. 9 is a diagram illustrating a process of performing motion compensation on a previous frame by using a motion prediction result, according to an embodiment.

FIG. 9 is a diagram illustrating a process of performing motion compensation on a previous frame by using a motion prediction result.

The third filter kernels 815 are referred to as a third filter kernel A 815-1 through a third filter kernel I 815-9 according to a location of a sample having a third value to distinguish the third filter kernels 815.

The image processing apparatus 100 may select a third filter kernel having the third value at a location corresponding to a prediction sample, for each of samples of the previous frame 530 located at the same location as samples of the current frame 510.

First, the sample a2 located at the upper left of the previous frame 530 will be described. When it is determined that a prediction sample of the sample a1 located at the upper left of the current frame 510 is the sample b2, the image processing apparatus 100 may select, for the sample a2, the third filter kernel F 815-6 including a sample having a value of 1 and located at the right of a center sample and the remaining samples having a value of 0. In this case, the image processing apparatus 100 may derive an upper left sample b2 of a prediction frame 900 through a multiplication operation and a sum operation based on 0, 0, 0, 0, 0, 1, 0, 0, and 0 of the third filter kernel F 815-6 and the sample p0, the sample p1, the sample p2, the sample p5, the sample a2, the sample b2, the sample p7, the sample d2, and the sample e2 of the previous frame 530. That is, it is found that the sample a2 is replaced with the sample b2 in the prediction frame 900 through a convolution operation for the sample a2 of the previous frame 530 and neighboring samples of the sample a2 of the previous frame 530.

Next, when it is determined that a prediction sample of the sample b1 located above a center sample of the current frame 510 is the sample e2, the third filter kernel H 815-8 including a sample having a value of 1 and located below the center sample and the remaining samples having a value of 0 may be selected for the sample b2. The image processing apparatus 100 may derive a sample e2 located above a center sample of the prediction frame 900 through a multiplication operation and a sum operation based on 0, 0, 0, 0, 0, 0, 0, 1, and 0 of the third filter kernel H 815-8 and the sample p1, the sample p2, the sample p3, the sample a2, the sample b2, the sample c2, the sample d2, the sample e2, and the sample f2 of the previous frame 530. That is, it is found that the sample b2 of the previous frame 530 is replaced with the sample e2 in the prediction frame 900 through a convolution operation for the sample b2 of the previous frame 530 and neighboring samples of the sample b2 of the previous frame 530.

Next, when it is determined that a prediction sample of the sample i1 located at the lower right of the current frame 510 is the sample i2, a third filter kernel E 815-5 including a sample having a value of 1 and located at the center sample and the remaining samples having a value of 0 may be selected for the sample i2. The image processing apparatus 100 may derive a sample i2 located at the lower right of the prediction frame 900 through a multiplication operation and a sum operation based on 0, 0, 0, 0, 1, 0, 0, 0, and 0 of the third filter kernel E 815-5 and the sample e2, the sample f2, the sample p8, the sample h2, the sample i2, the sample p10, the sample p13, the sample p14, and the sample p15 of the previous frame 530. That is, it is found that the sample i2 of the previous frame 530 is maintained as the sample i2 in the prediction frame 900 through a convolution operation for the sample i2 of the previous frame 530 and neighboring samples of the sample i2 of the previous frame 530.

When a convolution operation is performed based on the third filter kernel 815 corresponding to each sample from a first sample to a last sample of the previous frame 530, the prediction frame 900 that is a prediction version of the current frame 510 may be generated.

Figure 10:
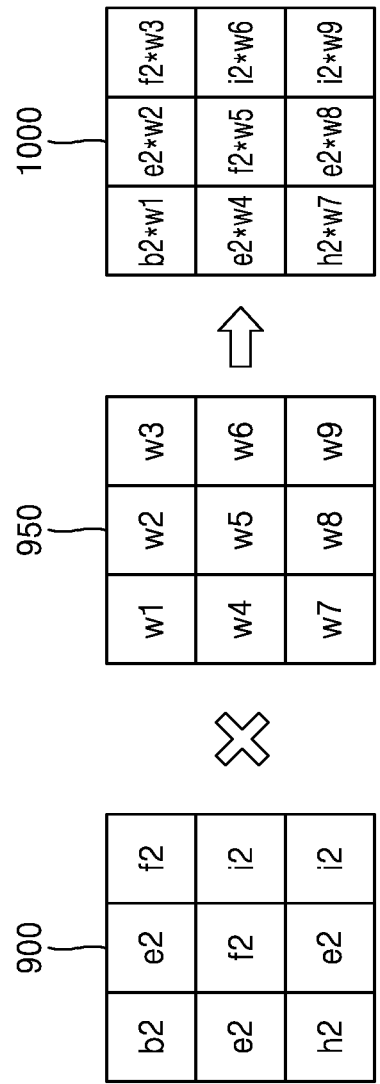
FIG. 10 is a diagram illustrating a process of applying a weight to a prediction frame obtained as a result of motion compensation, according to an embodiment.

FIG. 10 is a diagram illustrating a process of applying a weight 950 to the prediction frame 900 obtained as a result of motion compensation.

The image processing apparatus 100 may calculate the weight 950 based on a difference value between a current sample in the current frame 510 and a prediction sample in the previous frame 530 (or a collocated sample in the prediction frame 900). The image processing apparatus 100 may calculate the weight 950 for each sample of the current frame 510.

As described above, the weight 950 indicates to what extent samples of the prediction frame 900 are helpful in processing the current frame 510.

The weight 950 may be derived based on Equation 1.

$$\text{Weight} = \frac{\sigma^2}{\text{Difference } Value^2 + \sigma^2} \quad \text{[Equation 1]}$$

In Equation 1, σ that is a pre-determined constant may be, for example, 16. Referring to Equation 1, it is found that, when a sample value of a current sample and a sample value of a prediction sample are the same, the weight 950 may be calculated to be 1, and as a difference value between the sample value of the current sample and the sample value of the prediction sample increases, the weight 950 decreases.

The image processing apparatus 100 may obtain a weighted prediction frame 1000 by multiplying each sample of the prediction frame 900 by the weight 950 corresponding to the sample.

As described above, the image processing apparatus 100 may obtain a weighted prediction output frame and a weighted prediction feature map by applying the corresponding weight 950 to each sample of a prediction output frame and a prediction feature map.

As described above, a motion prediction process and a motion compensation process according to an embodiment of the disclosure may be performed based on a convolution operation. Because a motion prediction process may be performed through one convolution operation (when the convolution operation 410 for a current frame is omitted) or two convolution operations as shown in FIG. 4, and a motion compensation process may be performed through one convolution operation as shown in FIG. 8, operation complexity may be significantly reduced.

A motion prediction process may also be applied to a downsampled current frame and a downsampled previous frame. This may be done to reduce load and complexity according to the motion prediction process. Here, the term 'downsampling' refers to a process of reducing the number of samples in a frame. Downsampling of a frame may be performed by using any of various methods. For example, the number of samples in a current frame and a previous frame may be reduced by pooling the current frame and the previous frame. Pooling may include max pooling or average pooling. Pooling may relate to a pooling layer used in the related-art field of artificial neural networks. According to an implementation example, downsampling of a current frame and a previous frame may be performed through any of various related-art downsampling algorithms.

When a motion prediction process is performed on a downsampled current frame and a downsampled previous frame, as many motion vectors as samples included in the downsampled current frame are derived. Because the number of motion vectors required in a motion compensation process is greater than the number of motion vectors obtained through a motion prediction process based on a downsampled frame, the number of motion vectors obtained in the motion prediction process may be increased.

An example of a method of increasing the number of motion vectors obtained in a motion prediction process will be described with reference to FIG. 11.

Figure 11:
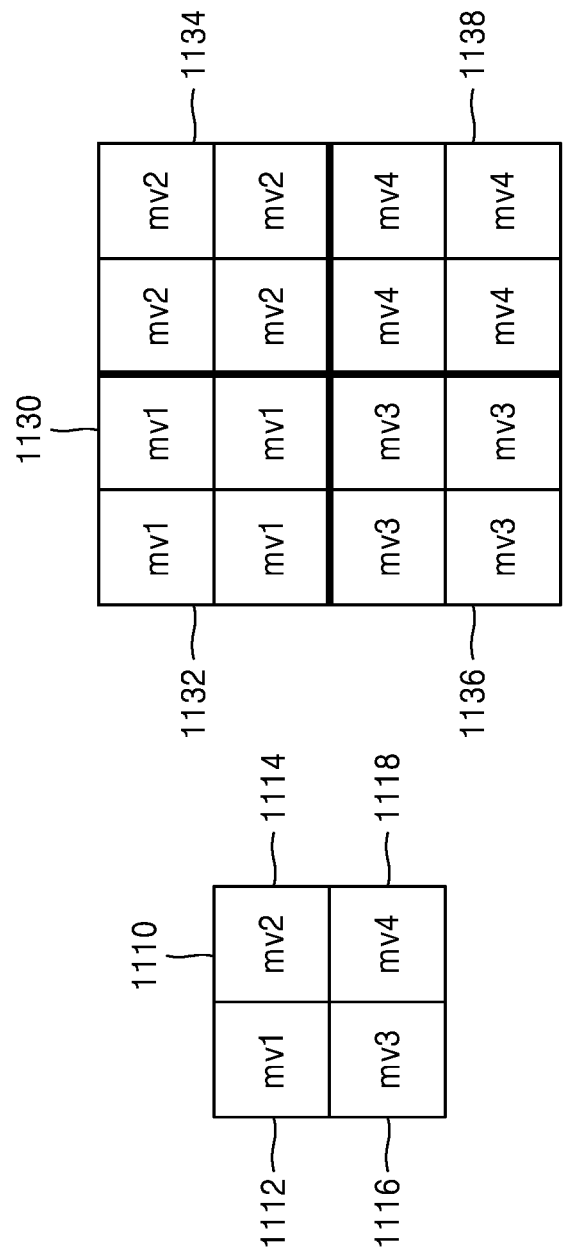
FIG. 11 is a diagram for describing a method of increasing the number of motion vectors obtained for a downsampled frame, according to an embodiment.

FIG. 11 is a diagram for describing a method of increasing the number of motion vectors obtained for a downsampled frame.

Referring to FIG. 11, a size of a downsampled frame 1110 is 2×2, and a size of a frame 1130 before downsampling is 4×4. A size of the downsampled frame 1110 may be changed in various ways according to a downsampling ratio.

When a motion prediction process is applied to the downsampled frame 1110, four motion vectors (i.e., filter kernels) corresponding to four samples included in the downsampled frame 1110 are derived. Because a size of the frame 1130 before downsampling is 4×4, 16 motion vectors are required in a motion compensation process.

For example, the image processing apparatus 100 may group samples of the frame 1130 before downsampling according to the number of samples in the downsampled frame 1110. The image processing apparatus 100 may allocate each motion vector derived in a motion prediction process to each sample group of the frame 1130 before downsampling. In this case, locations of the sample groups of the frame 1130 before downsampling and locations of the samples in the downsampled frame 1110 may be considered.

In detail, a motion vector mv1 derived for an upper left sample 1112 from among samples 1112, 1114, 1116, and 1118 in the downsampled frame 1110 may be allocated to a sample group 1132 located at the upper left from among sample groups 1132, 1134, 1136, and 1138 of the frame 1130 before downsampling. Accordingly, motion compensation may be performed based on the motion vector mv1 on samples included in the sample group 1132 located at the upper left of the frame 1130. It is noted that motion compensation is performed on a previous frame before downsampling.

A motion vector mv2 derived for the upper right sample 1114 from among the samples 1112, 1114, 1116, and 1118 in the downsampled frame 1110 may be allocated to the sample group 1134 located at the upper right from among the sample groups 1132, 1134, 1136, and 1138 of the frame 1130 before downsampling. Accordingly, motion compensation may be performed based on the motion vector mv2 on samples included in the sample group 1134 located at the upper right of the frame 1130.

Assuming that the number of samples included in a sample group is large, when the same motion vector is applied to all of the samples included in the sample group, the accuracy of motion compensation may be reduced.

In another example, the image processing apparatus 100 may apply, to samples adjacent to a boundary with an adjacent sample group from among samples included in a sample group, a motion vector obtained by combining a motion vector allocated to the sample group and a motion vector allocated to the adjacent sample group.

In another example, the image processing apparatus 100 may obtain motion vectors for motion compensation of the frame 1130 before downsampling by interpolating motion vectors obtained for the downsampled frame 1110. Examples of interpolation may include bilinear interpolation, bicubic interpolation, and nearest-neighbor interpolation.

When motion prediction is performed on the downsampled frame 1110, the number of weights derived in a weight derivation process is also less than the number of weights required in a gating process. Accordingly, the image processing apparatus 100 increases the number of weights obtained through a weight derivation process. In embodiments, a gating process may applied to a prediction frame generated through a motion compensation process from a previous frame before downsampling.

For example, the image processing apparatus 100 may group samples of the frame 1130 before downsampling according to the number of samples in the downsampled frame 1110. The image processing apparatus 100 may allocate each weight derived in a weight derivation process to each sample group of the frame 1130 before downsampling. In this case, locations of the sample groups of the frame 1130 before downsampling and locations of the samples in the downsampled frame 1110 may be considered.

In detail, a first weight derived for the upper left sample 1112 from among the samples 1112, 1114, 1116, and 1118 in the downsampled frame 1110 may be applied to the sample group 1132 located at the upper left from among the sample groups 1132, 1134, 1136, and 1138 of the frame 1130 before downsampling. Accordingly, a gating process may be performed based on the first weight on samples included in the sample group 1132 located at the upper left in the frame 1130. Also, a second weight derived for the upper right sample 1114 from among the samples 1112, 1114, 1116, and 1118 in the downsampled frame 1110 may be allocated to the sample group 1134 located at the upper right from among the sample groups 1132, 1134, 1136, and 1138 of the frame 1130 before downsampling. Accordingly, a gating process may be performed based on the second weight on samples included in the sample group 1134 located at the upper right in the frame 1130.

In another example, the image processing apparatus 100 may apply, to samples adjacent to a boundary with an adjacent sample group from among samples included in a sample group, a weight obtained by combining a weight allocated to the sample group and a weight allocated to the adjacent sample group.

In another example, the image processing apparatus 100 may obtain weights for a gating process of the frame 1130 before downsampling by interpolating weights obtained for the downsampled frame 1110. Examples of interpolation may include bilinear interpolation, bicubic interpolation, and nearest-neighbor interpolation.

Although a motion prediction process and motion compensation processes are performed based on a convolution operation, this is merely an example. A motion prediction process and a motion compensation process may be performed through a related-art algorithm used in inter prediction of a video codec.

For example, a motion prediction process may be performed based on a block matching algorithm or an optical flow algorithm. A block matching algorithm and an optical flow are algorithms for searching a previous frame for a sample or block that is most similar to a sample or block in a current frame. A motion vector between a sample or block in a current frame and a similar sample or block in a previous frame may be obtained through a block matching algorithm and an optical flow algorithm, and a prediction frame may be obtained by performing motion compensation on the previous frame based on the obtained motion vector.

Examples of a neural network used to process frames will be de described with reference to FIGS. 12 and 13.

As described with reference to FIG. 2, when the current frame $X_t$, the weighted prediction frame $X'_{t\_pred}$, the weighted prediction output frame $Y'_{t\_pred}$ and the weighted prediction feature map $S'_{t\_pred}$ are processed by using the neural network 250, the current output frame $Y_t$ corresponding to the current frame $X_t$ may be obtained.

The neural network 250 may include one or more sub-neural networks, and each sub-neural network may include a fusion layer and a plurality of convolution layers.

Figure 12:
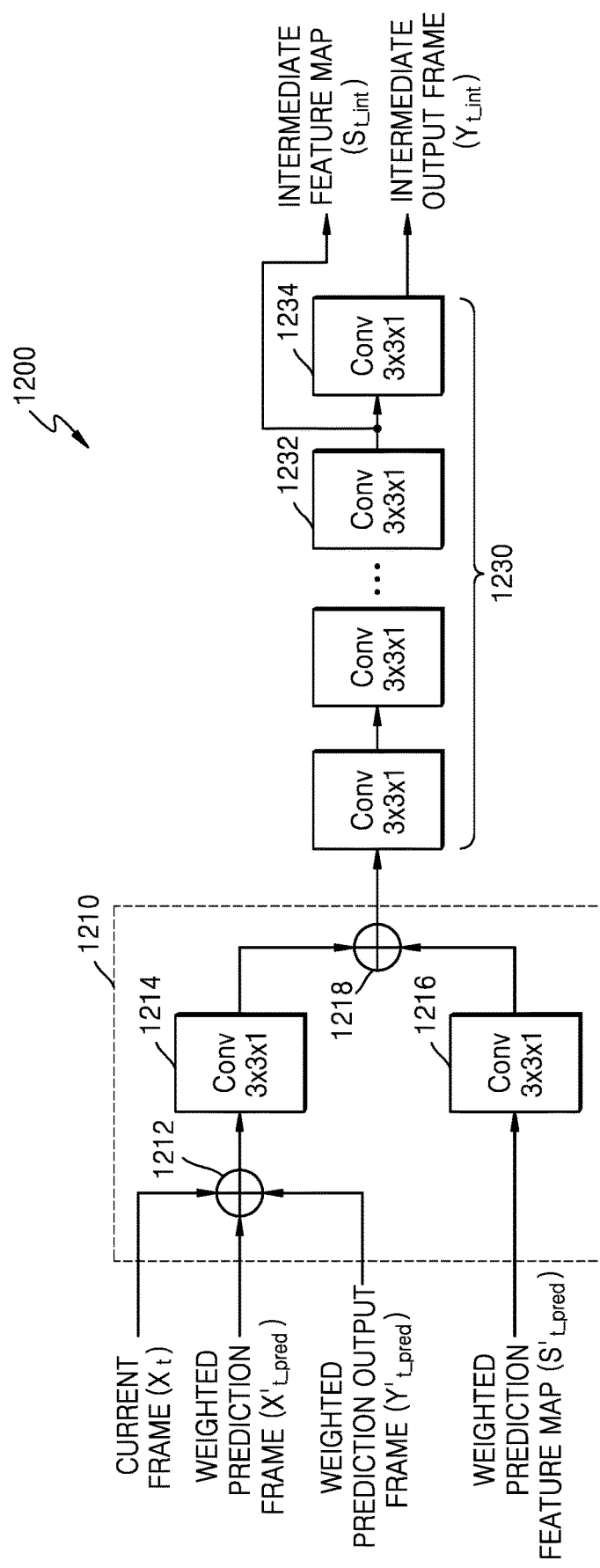
FIG. 12 is a diagram illustrating a structure of a first sub-neural network included in a neural network, according to an embodiment.

An example of a structure of a first sub-neural network 1200 from among the one or more sub-neural networks is illustrated in FIG. 12.

Referring to FIG. 12, the first sub-neural network 1200 may include a fusion layer 1210 including a first convolution layer 1214 and a second convolution layer 1216, and a plurality of third convolution layers 1230. In a convolution layer, a convolution operation is performed on input data based on a filter kernel determined through training.

The fusion layer 1210 fuses the current frame $X_t$, and data output through a gating process, that is, the weighted prediction frame $X'_{t\_pred}$ the weighted prediction output frame $Y'_{t\_pred}$ and the weighted prediction feature map $S'_{t\_pred}$.

First, the current frame $X_t$, the weighted prediction frame $X'_{t\_pred}$ and the weighted prediction output frame $Y'_{t\_pred}$ are concatenated, for example illustrated as concatenation 1212, and then are input to the first convolution layer 1214. Concatenation may refer to a process of combining the current frame $X_t$, the weighted prediction frame $X'_{t\_pred}$ and the weighted prediction output frame $Y'_{t\_pred}$ in a channel direction.

Data obtained as a result of the concatenation 1212 is convolution processed in the first convolution layer 1214. 3×3×1 in the first convolution layer 1214 indicates convolution processing for input data by using one filter kernel having a size of 3×3. One feature map is generated by one filter kernel as a result of convolution processing.

In addition to a result of concatenating the current frame $X_t$, the weighted prediction frame $X'_{t\_pred}$, and the weighted prediction output frame $Y'_{t\_pred}$ being input to the first convolution layer 1214, the weighted prediction feature map $S'_{t\_pred}$ is input to the second convolution layer 1216. The weighted prediction feature map $S'_{t\_pred}$ is convolution processed in the second convolution layer 1216. 3×3×1 in the second convolution layer 1216 indicates convolution processing for input data by using one filter kernel having a size of 39×3. One feature map is generated by one filter kernel as a result of convolution processing.

Data output from the first convolution layer 1214 and data output from the second convolution layer 1216 are concatenated, for example illustrated as concatenation 1218, and then are sequentially processed by the plurality of third convolution layers 1230.

In embodiments, in the fusion layer 1210, unlike the current frame $X_t$, the weighted prediction frame $X'_{t\_pred}$ and the weighted prediction output frame $Y'_{t\_pred}$ only the weighted prediction feature map $S'_{t\_pred}$ may be distinguished and be input to the second convolution layer 1216, for example because a domain of the weighted prediction feature map $S'_{t\_pred}$ is different from domains of the current frame $X_t$, the weighted prediction frame $X'_{t\_pred}$, and the weighted prediction output frame $Y'_{t\_pred}$. Because the weighted prediction feature map $S'_{t\_pred}$ is data of a feature domain obtained in a process of processing a frame whereas the current frame $X_t$, the weighted prediction frame $X'_{t\_pred}$, and the weighted prediction output frame $Y'_{t\_pred}$ are image data corresponding to a processing target or image data obtained as a processing result, they are distinguished, are convolution processed, and then are concatenated. That is, the first convolution layer 1214 and the second convolution layer 1216 may function to match domains of the current frame $X_t$, the weighted prediction frame $X'_{t\_pred}$, the weighted prediction output frame $T'_{t\_pred}$, and the weighted prediction feature map $S'_{t\_pred}$.

When data output from the first convolution layer 1214 and data output from the second convolution layer 1216 are concatenated, for example illustrated as concatenation 1218, and then are sequentially processed by the plurality of third convolution layers 1230, the intermediate output frame $Y_{t\_int}$ may be obtained. As shown in FIG. 12, the intermediate output frame $Y_{t\_int}$ is output from a last layer 1234 of the plurality of third convolution layers 1230, and the intermediate feature map $S_{t\_int}$ is output from a previous layer 1232 of the last layer 1234. Although the last layer 1234 is located next to the previous layer 1232 in FIG. 12, one or more convolution layers may be located between the previous layer 1232 and the last layer 1234.

3×3×1 in the third convolution layers 1230 indicates convolution processing for input data by using one filter kernel having a size of 3×3. One feature map or one output frame may be generated by one filter kernel as a result of convolution processing.

The intermediate feature map $S_{t\_int}$ and the intermediate output frame $Y_{t\_int}$ output from the plurality of third convolution layers 1230 are input to a next sub-neural network.

When a neural network includes only one sub-neural network, the current output frame $Y_t$ is output from the last layer 1234 of the plurality of third convolution layers 1230, and the current feature map $S_t$ is output from the previous layer 1232 of the last layer 1234.

The current output frame $Y_t$ and the current feature map $S_t$ may be used in a process of processing a next frame.

A structure of the first sub-neural network 1200 of FIG. 12 is merely an example, and the number of convolution layers included in the first sub-neural network 1200, a size of a filter kernel, and the number of filter kernels may be changed in various ways according to an implementation method.

Figure 13:
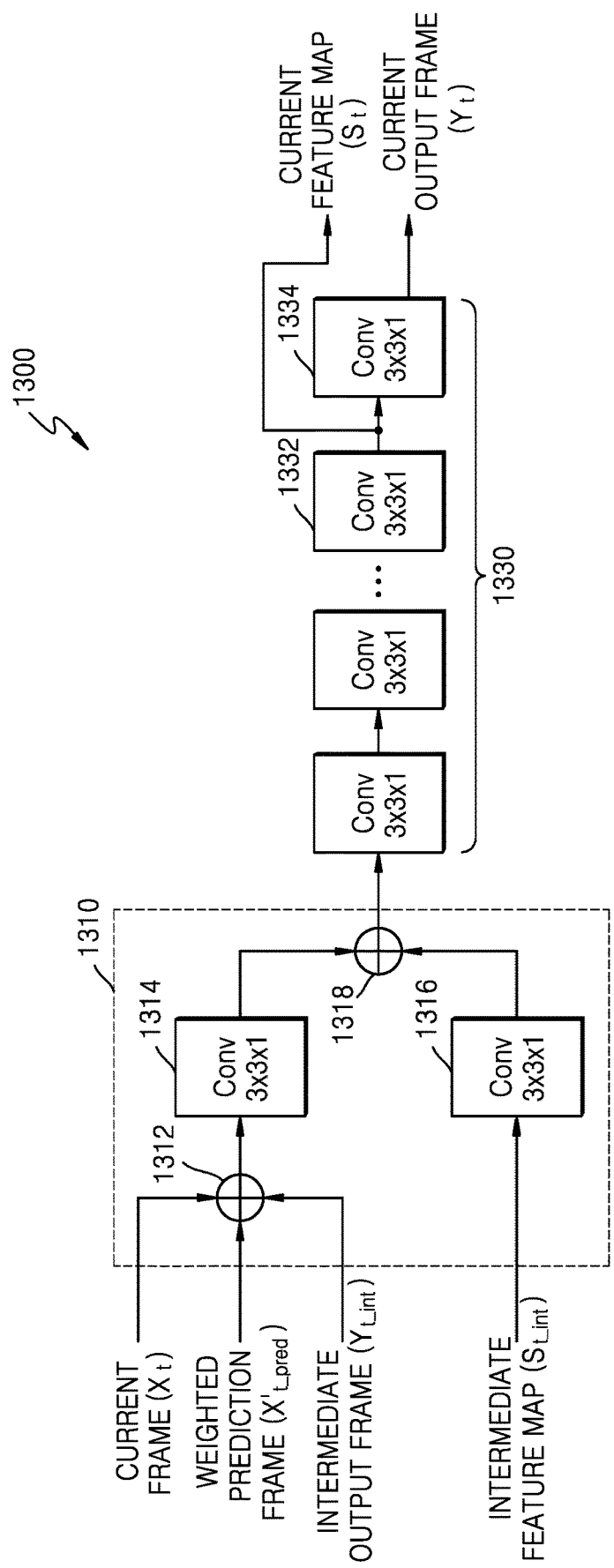
FIG. 13 is a diagram illustrating a structure of a last sub-neural network included in a neural network, according to an embodiment.

FIG. 13 is a diagram illustrating a structure of a last sub-neural network 1300 included in a neural network.

Like the first sub-neural network 1200, the last sub-neural network 1300 may include a fusion layer 1310 including a first convolution layer 1314 and a second convolution layer 1316, and a plurality of third convolution layers 1330. In a convolution layer, a convolution operation is performed for input data based on a filter kernel determined through training.

The fusion layer 1310 fuses the current frame $X_t$, the weighted prediction frame $X'_{t\_pred}$, the intermediate output frame $Y_{t\_int}$ output from a previous sub-neural network, and the intermediate feature map $S_{t\_int}$ output from the previous sub-neural network.

First, the current frame $X_t$, the weighted prediction frame $X'_{t\_pred}$, and the intermediate output frame $Y_{t\_int}$ are concatenated, for example illustrated as concatenation 1312, and then are input to the first convolution layer 1314.

Data output as a result of the concatenation 1312 is convolution processed in the first convolution layer 1314. 3×3×1 in the first convolution layer 1314 indicates convolution processing for input data by using one filter kernel having a size of 3×3. One feature map is generated by one filter kernel as a result of convolution processing.

In addition to a result of concatenating the current frame $X_t$, the weighted prediction frame $X'_{t\_pred}$, and the intermediate output frame $Y_{t\_int}$ being input to the first convolution layer 1314, the intermediate feature map $S_{t\_int}$ is input to the second convolution layer 1316. As described above, the intermediate feature map $S_{t\_int}$ is convolution processed in the second convolution layer 1316. 3×3×1 in the second convolution layer 1316 indicates convolution processing for input data by using one filter kernel having a size of 3×3. One feature map is generated by one filter kernel as a result of convolution processing.

As described above, the first convolution layer 1314 and the second convolution layer 1316 in the fusion layer 1310 may function to match domains of the current frame $X_t$, the weighted prediction frame $X'_{t\_pred}$ the intermediate output frame $Y_{t\_int}$, and the intermediate feature map $S_{t\_int}$.

Data output from the first convolution layer 1314 and data output from the second convolution layer 1316 are concatenated, for example illustrated as concatenation 1318, and then are sequentially processed by the plurality of third convolution layers 1330.

When data output from the first convolution layer 1314 and data output from the second convolution layer 1316 are concatenated and then are sequentially processed by the plurality of third convolution layers 1330, the current output frame $Y_t$ may be obtained.

As shown in FIG. 13, the current output frame $Y_t$ is output from a last layer 1334 of the plurality of third convolution layers 1330, and the current feature map $S_t$ is output from a previous layer 1332 of the last layer 1334. Although the last layer 1334 is located next to the previous layer 1332 in FIG. 13, one or more convolution layers may be located between the previous layer 1332 and the last layer 1334.

When the sub-neural network 1300 of FIG. 13 is not a last sub-neural network, the intermediate output frame $Y_{t\_int}$ may be output from the last layer 1334 of the plurality of third convolution layers 1330, and the intermediate feature map $S_{t\_int}$ may be output from the previous layer 1332 of the last layer 1334. The output intermediate output frame $Y_{t\_int}$ and the output intermediate feature map $S_{t\_int}$ may be input to a next sub-neural network.

3×3×1 in the third convolution layers 1330 indicates convolution processing for input data by using one filter kernel having a size of 3×3. One feature map or one output frame may be generated by one filter kernel as a result of convolution processing.

A structure of the sub-neural network of FIG. 13 is merely an example, and the number of convolution layers included in the sub-neural network 1300, a size of a filter kernel, and the number of filter kernels may be changed in various ways according to an implementation method.

Figure 14:
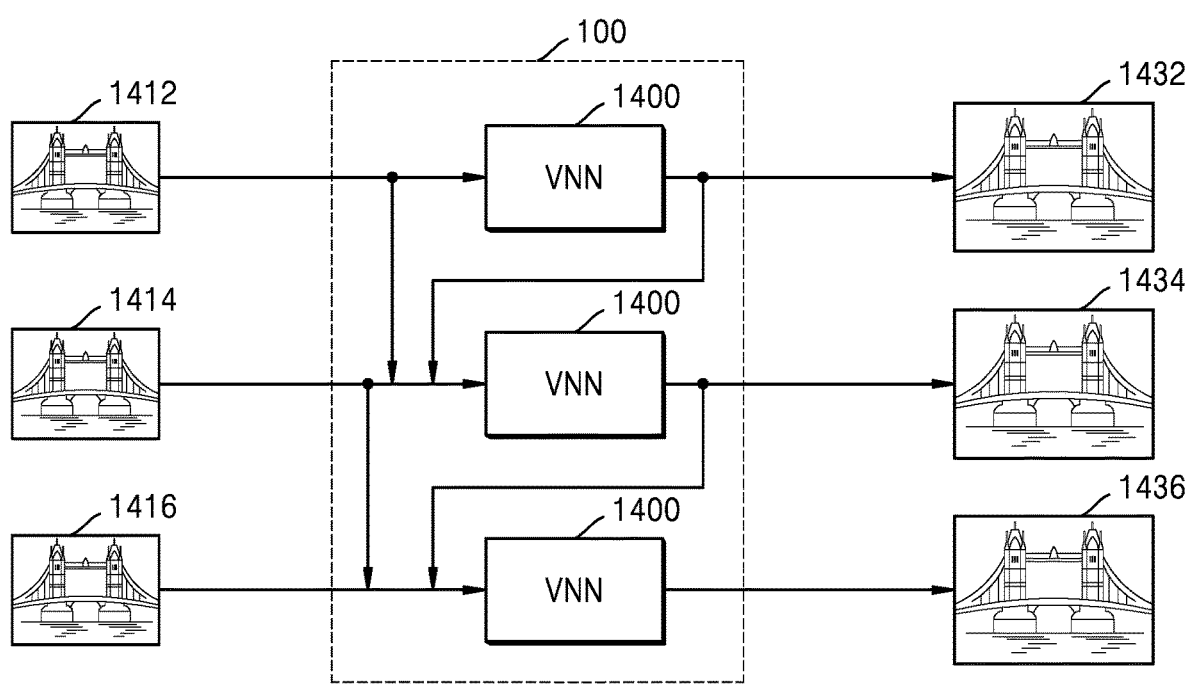
FIG. 14 is a diagram illustrating an application example of an image processing method, according to an embodiment.

FIG. 14 is a diagram illustrating an application example of an image processing method, according to an embodiment of the disclosure.

The application example of FIG. 14 shows a process of obtaining output frames having a resolution higher than that of input frames through image processing for the input frames.

A video neural network (VNN) 1400 of FIG. 14 corresponds to the neural network 250 of FIG. 2. It is assumed that a motion prediction process, a motion compensation process, a weight derivation process, and a gating process are performed before frames are input to the VNN 1400.

When a first frame 1412 is processed by the VNN 1400, a first output frame 1432 having a resolution higher than that of the first frame 1412 is obtained. The first frame 1412 and the first output frame 1432 are input to the VNN 1400 along with a second frame 1414, and a second output frame 1434 having a resolution higher than that of the second frame 1414 is obtained as a processing result by the VNN 1400. The second frame 1414 and the second output frame 1434 are input to the VNN 1400 along with a third frame 1416, and a third output frame 1436 having a resolution higher than that of the third frame 1416 is obtained as a processing result by the VNN 1400.

The application example of FIG. 14 may be useful when a resolution of frames received from a server or the like is to be increased. The server transmit a small bitrate to the image processing apparatus 100 by encoding frames of a low resolution, and the image processing apparatus 100 may obtain output frames having a higher resolution by processing frames of a low resolution through decoding.

Figure 15:
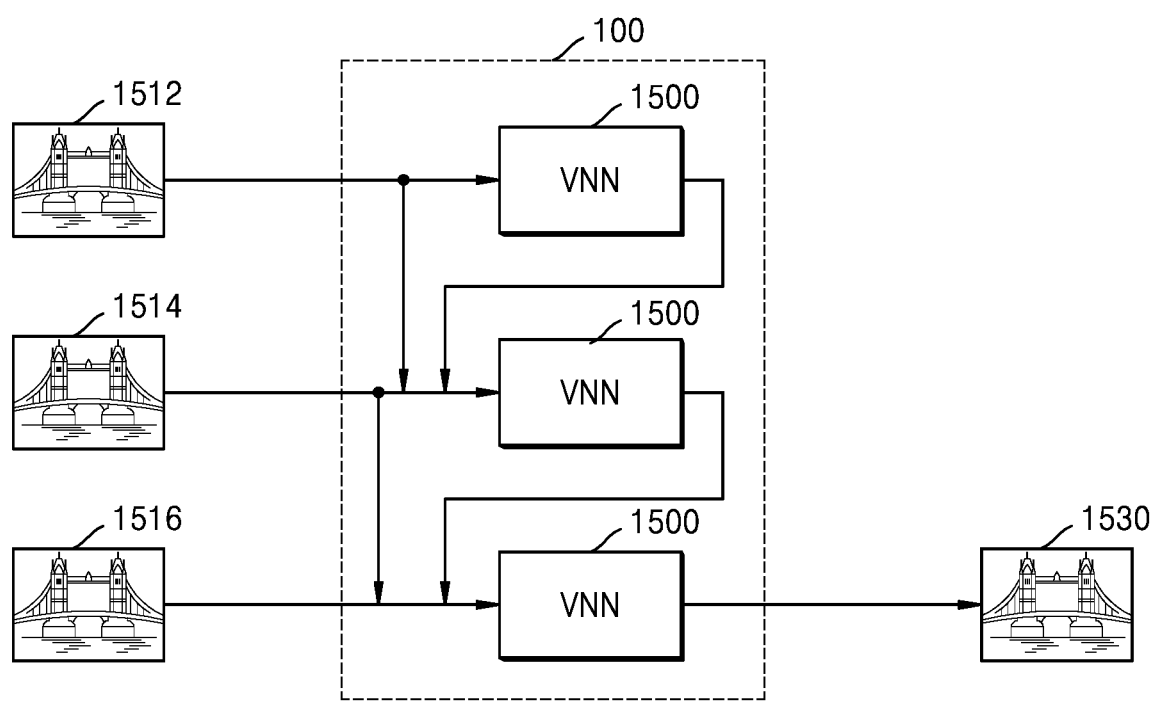
FIG. 15 is a diagram illustrating an application example of an image processing method, according to another embodiment.

FIG. 15 is a diagram illustrating an application example of an image processing method, according to another embodiment of the disclosure.

The application example of FIG. 15 shows a process of obtaining one output frame combined with characteristics of input frames through image processing for the input frames.

As described above, it is assumed that a motion prediction process, a motion compensation process, a weight derivation process, and a gating process are performed before frames are input to a VNN 1500.

A first frame 1512 is input to the VNN 1500, and a result of processing the first frame 1512 by the VNN 1500 is input to the VNN 1500 along with the first frame 1512 and a second frame 1514. A processing result by the VNN 1500 is input again to the VNN 1500 along with the second frame 1514 and a third frame 1516. As a processing result by the VNN 1500, an output frame 1530 in which all characteristics of the first frame 1512, the second frame 1514, and the third frame 1516 are reflected may be obtained.

The application example of FIG. 15 may be useful when a dynamic range of frames is to be increased. For example, when one frame is captured with a long exposure time and another frame is captured with a short exposure time, an output frame having a high dynamic range may be obtained by including characteristics of the two frames.

Figure 16:
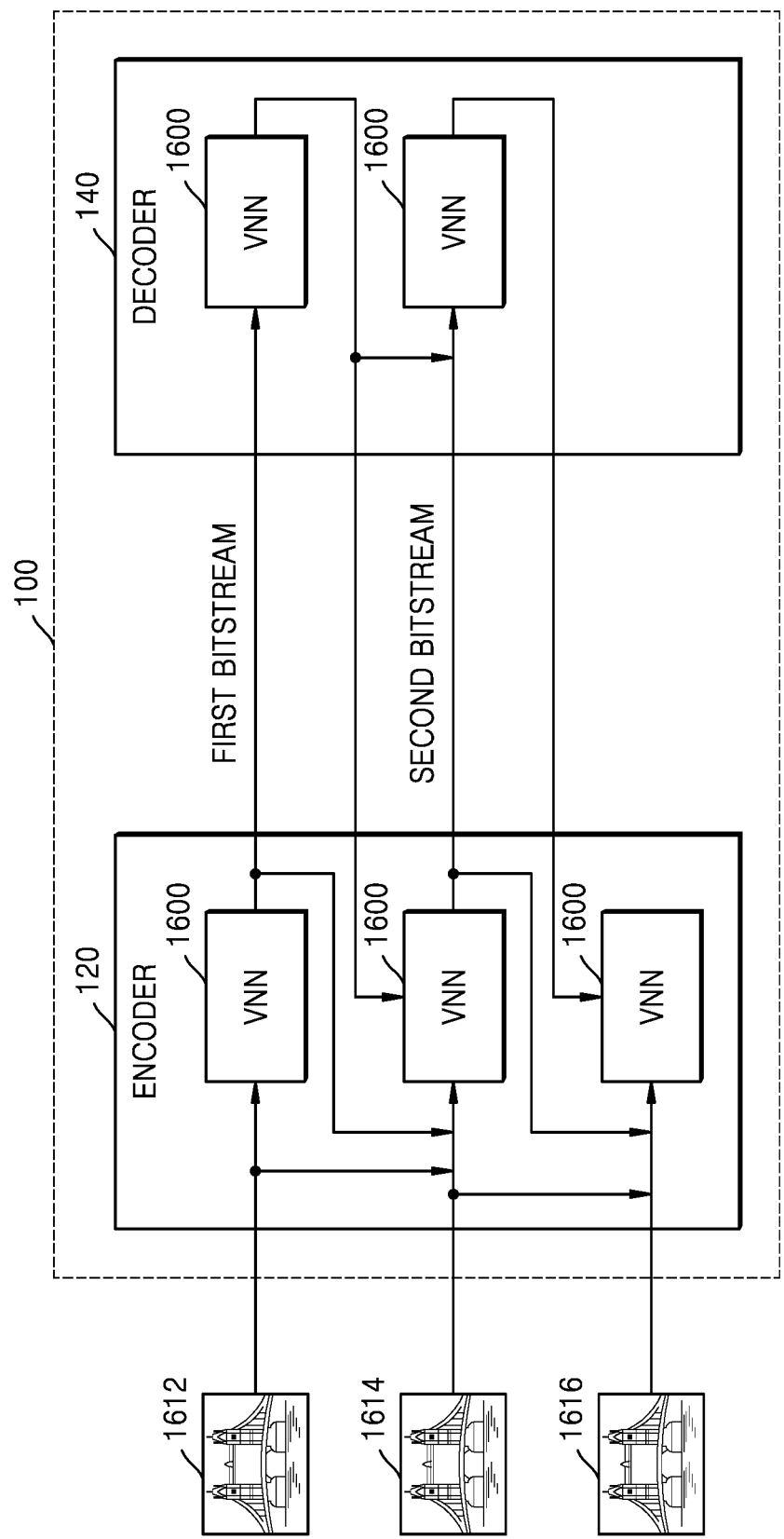
FIG. 16 is a diagram illustrating an application example of an image processing method, according to another embodiment.

FIG. 16 is a diagram illustrating an application example of an image processing method, according to another embodiment of the disclosure.

The application example of FIG. 16 considers a case where the image processing apparatus 100 operates as a server or an image provider. In general, a server encodes an image and transmits the image to a terminal device, and the terminal device decodes a bitstream received from the server and reconstructs the image. When processing frames to compensate for loss occurring in an encoding/decoding process, the image processing apparatus 100 may also use a frame that is encoded by an encoder 120 and then is decoded by a decoder 140.

In detail, the image processing apparatus 100 obtains a first output frame A by processing a first frame 1612 based on the VNN 1600. A first bitstream is generated through encoding of the first output frame A, and the first output frame A is reconstructed through decoding of the first bitstream. The image processing apparatus 100 obtains a first output frame B by processing the first output frame A by using the VNN 1600.

The first frame 1612, the first output frame A, and the first output frame B are input to the VNN 1600 along with a second frame 1614. Although one output frame is input to the VNN 1600 along with a next frame in the above embodiments of the disclosure, in the application example of FIG. 16, two output frames are input to the VNN 1600 along with a next frame. A motion compensation process and a gating process may be applied to both the two output frames before being input to the VNN 1600.

The second frame 1614, the first frame 1612, the first output frame A, and the first output frame B are processed by the VNN 1600 and a second output frame A is obtained. A second bitstream is generated through encoding of the second output frame A, and the second output frame A is reconstructed through decoding of the second bitstream. The image processing apparatus 100 processes obtains a second output frame B by processing the first output frame B by using the VNN 1600. In embodiments, the image processing apparatus 100 may obtain a second output frame B by processing the first output frame A reconstructed through decoding along with the second output frame A and the first output frame B by using the VNN 1600.

The second frame 1614, the second output frame A, and the second output frame B are input to the VNN 1600 along with a third frame 1616. The third frame 1616, the second frame 1614, the second output frame A, and the second output frame B may be processed by the VNN 1600 and a third output frame A may be obtained.

Figure 17:
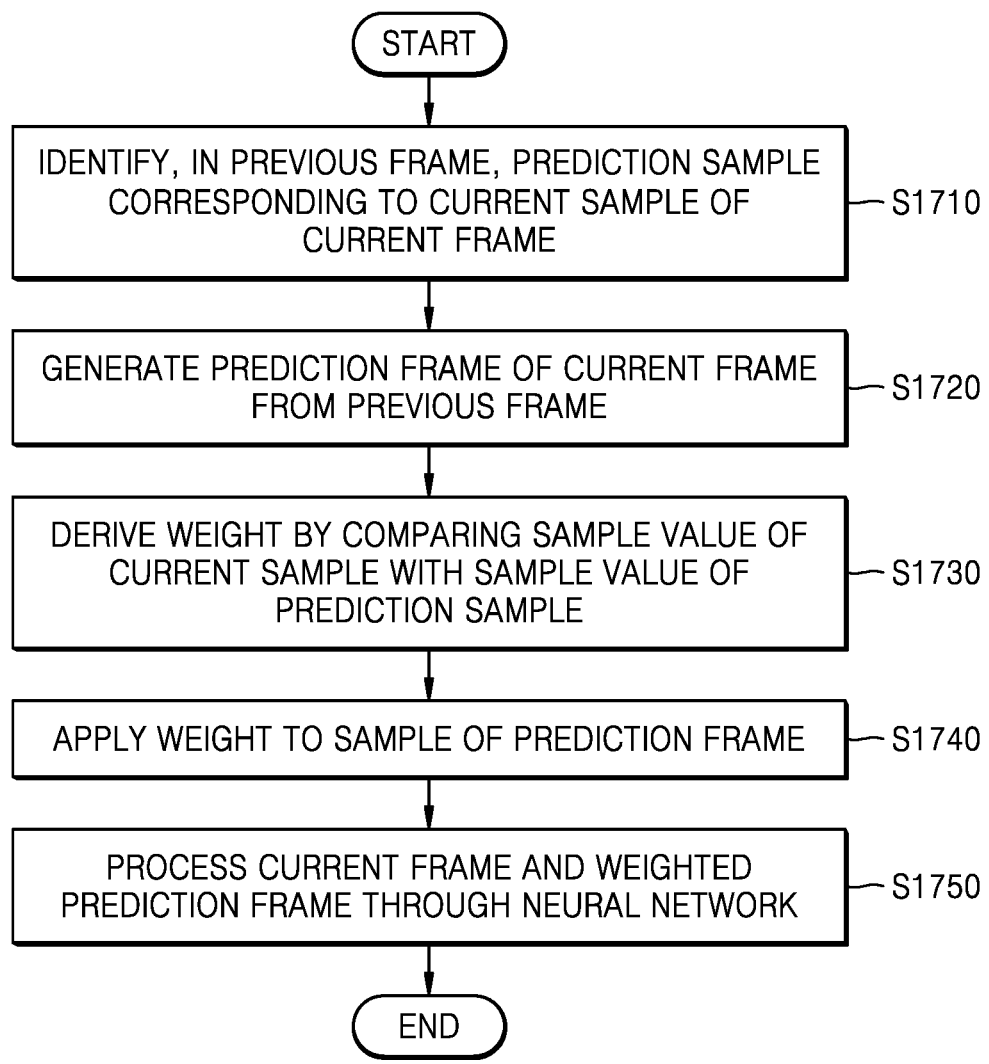
FIG. 17 is a flowchart illustrating a method of processing multi-frames, according to an embodiment.

FIG. 17 is a flowchart illustrating a method of processing multi-frames, according to an embodiment of the disclosure.

In operation S1710, the image processing apparatus 100 identifies, in a previous frame, a prediction sample corresponding to a current sample of a current frame. In order to identify the prediction sample, motion prediction may be performed on the current frame and the previous frame. As described above, in order to identify the prediction sample, a convolution operation may be performed on the current frame and the previous frame.

In operation S1720, the image processing apparatus 100 generates a prediction frame of the current frame by changing a sample value of a collocated sample of the previous frame according to a sample value of the prediction sample. The prediction frame may be generated through a convolution operation for the previous frame based on filter kernels corresponding to motion vectors.

In operation S1730, the image processing apparatus 100 derives a weight by comparing a sample value of the current sample with the sample value of the prediction sample. The image processing apparatus 100 may determine to decrease the weight as a difference value between the sample value of the current sample and the sample value of the prediction sample increases, and may determine to increase the weight as the difference value between the sample value of the current sample and the sample value of the prediction sample decreases.

In operation S1740, the image processing apparatus 100 applies the weight to a collocated sample of the prediction frame. The image processing apparatus 100 may multiply the collocated sample of the prediction frame by the weight.

In operation S1750, the image processing apparatus 100 obtains a current output frame by processing the current frame and a weighted prediction frame through a neural network including a convolution layer.

Embodiments of the disclosure may be implemented as a computer-executable program, and the program may be stored in a machine-readable storage medium.

The machine-readable storage medium may be provided as a non-transitory storage medium. Here, 'non-transitory storage medium' means that the storage medium does not include a signal and is tangible, but does not distinguish whether data is stored semi-permanently or temporarily in the storage medium. For example, the 'non-transitory storage medium' may include a buffer in which data is temporarily stored.

According to an embodiment of the disclosure, methods according to various embodiments of the disclosure may be provided in a computer program product. The computer program product is a product purchasable between a seller and a purchaser. The computer program product may be distributed in the form of a machine-readable storage medium (e.g., a CD-ROM), or may be distributed (e.g., downloaded or uploaded) online via an application store (e.g., Play Store™) or between two user devices (e.g., smartphones) directly. When distributed online, at least part of the computer program product (e.g., a downloadable application) may be temporarily generated or at least temporarily stored in a machine-readable storage medium, such as a memory of a manufacturer's server, a server of an application store, or a relay server.

While one or more embodiments of the disclosure have been described with reference to the drawings, it will be understood by one of ordinary skill in the art that various changes in form and details may be made therein without departing from the spirit and scope as defined by the following claims.

The invention claimed is:

1. An image processing apparatus comprising:
   a memory configured to store one or more instructions; and
   a processor configured to execute the one or more instructions stored in the memory to cause the image processing apparatus to:
   identify, in a previous frame, a prediction sample corresponding to a current sample of a current frame,
   generate a prediction frame for the current frame by using the prediction sample,
   generate a prediction output frame from a previous output frame corresponding to the previous frame according to a positional relationship between the current sample and the prediction sample,
   derive a weight by comparing a sample value of the current sample with the sample value of the prediction sample, apply the weight to collocated samples of the prediction frame and the prediction output frame, to obtain a weighted prediction frame and a weighted prediction output frame, and obtain a current output frame by processing the current frame, the weighted prediction frame and the weighted prediction output frame through a neural network comprising a convolution layer, wherein the collocated samples of the prediction frame and the prediction output frame are collocated with the current sample.

2. The image processing apparatus of claim 1, wherein the processor is further configured to cause the image processing apparatus to identify, as the prediction sample, a most similar sample of the previous frame, wherein the most similar sample has a sample value that is most similar to the sample value of the current sample from among sample values of a collocated sample of the previous frame and neighboring samples of the collocated sample of the previous frame, wherein the collocated sample of the previous frame is collocated with the current sample.

3. The image processing apparatus of claim 2, wherein the processor is further configured to cause the image processing apparatus to:

perform convolution processing on the current sample and neighboring samples of the current sample by using a pre-determined first filter kernel to obtain a first sample value corresponding to the first filter kernel, perform the convolution processing on the collocated sample of the previous frame and the neighboring samples of the collocated sample by using a plurality of pre-determined second filter kernels to obtain second sample values corresponding to the plurality of second filter kernels, identify a second sample value that is most similar to the first sample value from among the second sample values, and determine, as the prediction sample, a corresponding sample which corresponds to the identified second sample value from among the collocated sample of the previous frame and the neighboring samples of the collocated sample of the previous frame.

4. The image processing apparatus of claim 3, wherein, in the first filter kernel, a first filter sample corresponding to the current sample has a pre-set first value, and remaining first filter samples have a value of 0.

5. The image processing apparatus of claim 4, wherein, in the plurality of second filter kernels, one second filter sample has a pre-set second value, and remaining second filter samples have the value of 0, wherein a location of the one second filter sample is different for each of the plurality of second filter kernels.

6. The image processing apparatus of claim 5, wherein a sign of the pre-set first value is opposite to a sign of the pre-set second value-.

7. The image processing apparatus of claim 3, wherein the processor is further configured to cause the image processing apparatus to execute the one of perform the convolution processing on the collocated sample of the previous frame and the neighboring samples of the collocated sample of the previous frame by using a pre-determined third filter kernel to generate the prediction frame, wherein, in the third filter kernel, a third filter sample corresponding to the prediction sample has a pre-set third value, and remaining third filter samples have a value of 0.

8. The image processing apparatus of claim 1, wherein the weight is inversely proportional to a difference between the sample value of the current sample and the sample value of the prediction sample.

9. The image processing apparatus of claim 1, wherein the processor is further configured to cause the image processing apparatus to:

obtain a previous feature map output as a result of processing the previous frame by using the neural network, generate a prediction feature map from the previous feature map according to the positional relationship between the current sample and the prediction sample, apply the weight to a collocated samples of the prediction feature map to obtain a weighted prediction feature map, and input the weighted prediction output frame, the weighted prediction feature map, the weighted prediction frame, and the current frame, to the neural network.

10. The image processing apparatus of claim 9, wherein the neural network comprises a plurality of sub-neural networks comprising a first convolution layer, a second convolution layer, and a plurality of third convolution layers, wherein the first convolution layer of a first sub-neural network is configured to perform convolution processing on a result of concatenating the weighted prediction output frame, the weighted prediction frame, and the current frame, wherein the second convolution layer of the first sub-neural network is configured to perform the convolution processing on the weighted prediction feature map, and wherein the plurality of third convolution layers of the first sub-neural network are configured to sequentially perform the convolution processing on a result of concatenating a feature map output from the first convolution layer of the first sub-neural network and a feature map output from the second convolution layer of the first sub-neural network.

11. The image processing apparatus of claim 10, wherein the first convolution layer of a sub-neural network other than the first sub-neural network is configured to perform the convolution processing on a result of concatenating the weighted prediction frame, the current frame, and an intermediate output frame output from a previous sub-neural network, wherein the second convolution layer of the sub-neural network other than the first sub-neural network is configured to perform the convolution processing on an intermediate feature map output from the previous sub-neural network, and wherein the plurality of third convolution layers of the sub-neural network other than the first sub-neural network are configured to sequentially perform the convolution processing on a result of concatenating a feature map output from the first convolution layer of the sub-neural network other than the first sub-neural network and a feature map output from the second convolution layer of the sub-neural network other than the first sub-neural network.

12. The image processing apparatus of claim 1, wherein the previous output frame comprises a first previous output frame output from the neural network, and a second previous output frame obtained as a result of processing the first previous output frame, which is reconstructed through encoding and decoding the first previous output frame, through the neural network.

13. The image processing apparatus of claim 1, wherein the processor is further configured to cause the image processing apparatus to transmit, to a terminal device, a bitstream generated through encoding performed on the current output frame.

14. A method, performed by an image processing apparatus, of processing multi-frames, the method comprising:
    identifying, in a previous frame, a prediction sample corresponding to a current sample of a current frame;
    generating a prediction frame for the current frame by using the prediction sample;
    generating a prediction output frame from a previous output frame corresponding to the previous frame according to a positional relationship between the current sample and the prediction sample;
    deriving a weight by comparing a sample value of the current sample with the sample value of the prediction sample;
    applying the weight to collocated samples of the prediction frame and the prediction output frame, to obtain a weighted prediction frame and a weighted prediction output frame; and
    processing the current frame, the weighted prediction frame and the weighted prediction output frame through a neural network comprising a convolution layer to obtain a current output frame,
    wherein the collocated samples of the prediction frame and the prediction output frame are collocated with the current sample.

15. A non-transitory computer-readable recording medium storing a program which, when executed by at least one processor, causes an image processing apparatus to:
    identifying, in a previous frame, a prediction sample corresponding to a current sample of a current frame;
    generating a prediction frame for the current frame by using the prediction sample;
    generating a prediction output frame from a previous output frame corresponding to the previous frame according to a positional relationship between the current sample and the prediction sample;
    deriving a weight by comparing a sample value of the current sample with the sample value of the prediction sample;
    applying the weight to collocated samples of the prediction frame and the prediction output frame, to obtain a weighted prediction frame and a weighted prediction output frame; and
    processing the current frame, the weighted prediction frame and the weighted prediction output frame through a neural network comprising a convolution layer to obtain a current output frame,
    wherein the collocated samples of the prediction frame and the prediction output frame are collocated with the current sample.

* * * * *